(12) United States Patent
Li et al.

(10) Patent No.: US 11,595,689 B2
(45) Date of Patent: Feb. 28, 2023

(54) LOCAL WEIGHTED PREDICTION

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Anish Mahendra Tamse, Seoul (KR); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/081,600

(22) Filed: Oct. 27, 2020

(65) Prior Publication Data

US 2021/0297703 A1    Sep. 23, 2021

Related U.S. Application Data

(60) Provisional application No. 62/992,675, filed on Mar. 20, 2020.

(51) Int. Cl.
*H04N 19/61* (2014.01)
*H04N 19/503* (2014.01)
*H04N 19/176* (2014.01)

(52) U.S. Cl.
CPC ........... *H04N 19/61* (2014.11); *H04N 19/176* (2014.11); *H04N 19/503* (2014.11)

(58) Field of Classification Search
None
See application file for complete search history.

(56) References Cited

U.S. PATENT DOCUMENTS

| 10,390,015 | B2 * | 8/2019 | Hu | H04N 19/48 |
| 10,645,395 | B2 * | 5/2020 | Yu | G01B 11/002 |
| 2012/0127002 | A1 * | 5/2012 | Shibahara | H04N 19/18 |
| | | | | 341/87 |
| 2017/0347103 | A1 * | 11/2017 | Yu | G01B 11/002 |

(Continued)

FOREIGN PATENT DOCUMENTS

WO    WO-2019009129 A1 *  1/2019    ........... H04N 19/157

OTHER PUBLICATIONS

Chen et al., "Algorithm description for Versatile Video Coding and Test Model 8 (VTM 8)," JVET-Q2002, 17th Meeting: Brussels, BE, Jan. 7-17, 2020 (92 pages).

(Continued)

*Primary Examiner* — Chikaodili E Anyikire
(74) *Attorney, Agent, or Firm* — ArentFox Schiff LLP

(57) ABSTRACT

Aspects of the disclosure provide methods, apparatuses, and non-transitory computer-readable storage mediums for video encoding/decoding. An apparatus includes processing circuitry that decodes prediction information for a current block in a current picture that is a part of a coded video sequence. The processing circuitry determines prediction samples of the current block based on a first linear transform of reference samples of the current block. One or more parameters of the first linear transform are determined based on one of the prediction information and one or more parameters of a second linear transform associated with another block in the coded video sequence. The processing circuitry reconstructs the current block based on the prediction samples.

20 Claims, 22 Drawing Sheets

(56) References Cited

U.S. PATENT DOCUMENTS

| | | | |
|---|---|---|---|
| 2019/0320167 A1* | 10/2019 | Abe | H04N 19/521 |
| 2020/0244968 A1* | 7/2020 | Jun | H04N 19/176 |
| 2020/0336738 A1* | 10/2020 | Xiu | H04N 19/583 |
| 2020/0382808 A1* | 12/2020 | Mullakhmetov | H04N 19/567 |
| 2021/0352277 A1* | 11/2021 | Filippov | H04N 19/105 |

OTHER PUBLICATIONS

Seregin et al., "CE10-related: Unidirectional illumination compensation," JVET-M0500, 13th Meeting: Marrakech, MA, Jan. 9-18, 2019 (4 pages).

Brass et al., "Versatile Video Coding (Draft 8)," JVET-Q2001, 17th Meeting: Brussels, BE, Jan. 7-17, 2020 (512 pages).

High efficiency video coding, Rec. ITU-t H.265, International Telecommunication Union, Dec. 2016. (664 pages).

\* cited by examiner

LOCAL WEIGHTED PREDICTION

INCORPORATION BY REFERENCE

This present application claims the benefit of priority to U.S. Provisional Application No. 62/992,675, "LOCAL WEIGHTED PREDICTION," filed on Mar. 20, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar MV derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge."

Referring to FIG. 1C, a current block (111) can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (112 through 116, respectively). In H.265, the MV prediction can use predictors from the same reference picture that the neighboring block is using.

SUMMARY

Aspects of the disclosure provide apparatuses for video encoding/decoding. An apparatus includes processing circuitry that decodes prediction information for a current block in a current picture that is a part of a coded video sequence. The processing circuitry determines prediction samples of the current block based on a first linear transform of reference samples of the current block. One or more parameters of the first linear transform are determined based on one of the prediction information and one or more parameters of a second linear transform associated with another block in the coded video sequence. The processing circuitry reconstructs the current block based on the prediction samples.

In one embodiment, the prediction information indicates an inter prediction mode for the current block.

In one embodiment, the other block is one of a neighboring block and a merge candidate of the current block.

In one embodiment, the processing circuitry determines whether the first linear transform is applied to the reference samples of the current block based on a first flag that is determined based on one of the prediction information and the merge candidate of the current block. The processing circuitry determines the prediction samples of the current block in response to the first linear transform being determined to be applied to the reference samples of the current block.

In one embodiment, the one or more parameters of the first linear transform are determined based on the merge candidate of the current block and the prediction information indicating one of a merge mode and a skip mode for the current block.

In one embodiment, one of the one or more parameters of the first linear transform is determined as a default value based on a second flag that is determined based on one of the prediction information and the merge candidate of the current block.

In one embodiment, each of the one or more parameters of the first linear transform includes a sign value and a magnitude value.

In one embodiment, each of the one or more parameters of the first linear transform is determined based on a set of values corresponding to the respective parameter and an index indicating one of the set of values for the respective parameter.

In one embodiment, each of the one or more parameters of the first linear transform is determined based on a delta value of the respective parameter relative to one of a default value and one of the one or more parameters of the second transform associated with the other block in the coded video sequence.

In one embodiment, the prediction information indicates a bi-directional prediction mode for the current block, and the processing circuitry determines the prediction samples of the current block based on the first linear transform of at least one reference block of the current block. Each of the at least one reference block corresponds to one prediction direction of the bi-directional prediction mode.

In one embodiment, the processing circuitry determines, for each prediction direction of the bi-directional prediction mode, a prediction block of the current block based on the first linear transform of one of the at least one reference block of the current block corresponding to the respective prediction direction. The processing circuitry determines the prediction samples of the current block based on an average of the prediction blocks.

In one embodiment, the prediction information indicates a bi-directional prediction mode for the current block, and the processing circuitry determines, for each prediction direction of the bi-directional prediction mode, a prediction block of the current block based on a reference block of the current block corresponding to the respective prediction direction. The processing circuitry determines the prediction samples of the current block based on the first linear transform of an average of the prediction blocks.

Aspects of the disclosure provide methods for video encoding/decoding. In the method, prediction information is decoded for a current block in a current picture that is a part of a coded video sequence. Prediction samples of the current block are determined based on a first linear transform of reference samples of the current block. One or more parameters of the first linear transform are determined based on one of the prediction information and one or more parameters of a second linear transform associated with another block in the coded video sequence. The current block is reconstructed based on the prediction samples.

Aspects of the disclosure also provide non-transitory computer-readable mediums storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Video Decoder and Encoder Systems

Figure 1A:
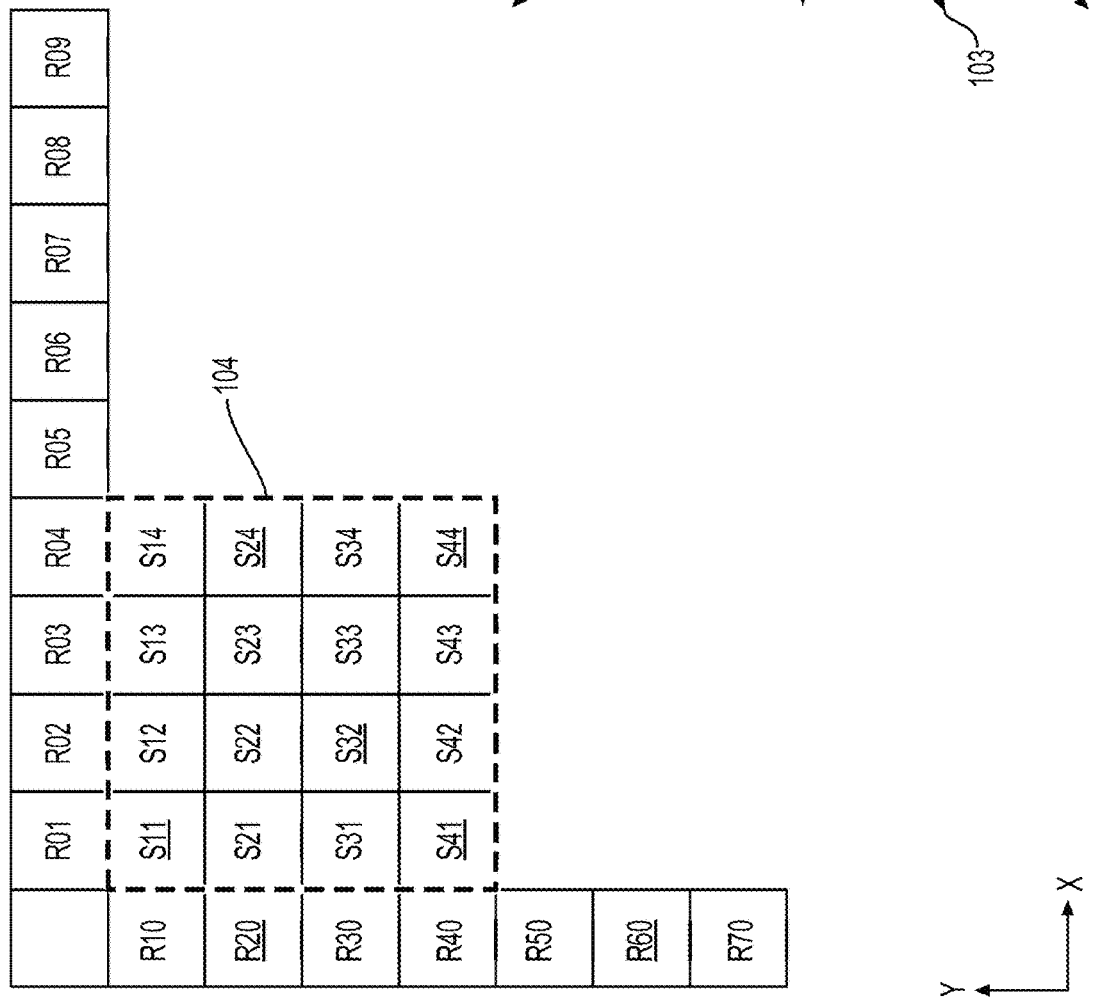
FIG. 1A is a schematic illustration of an exemplary subset of intra prediction modes.
Figure 1B:
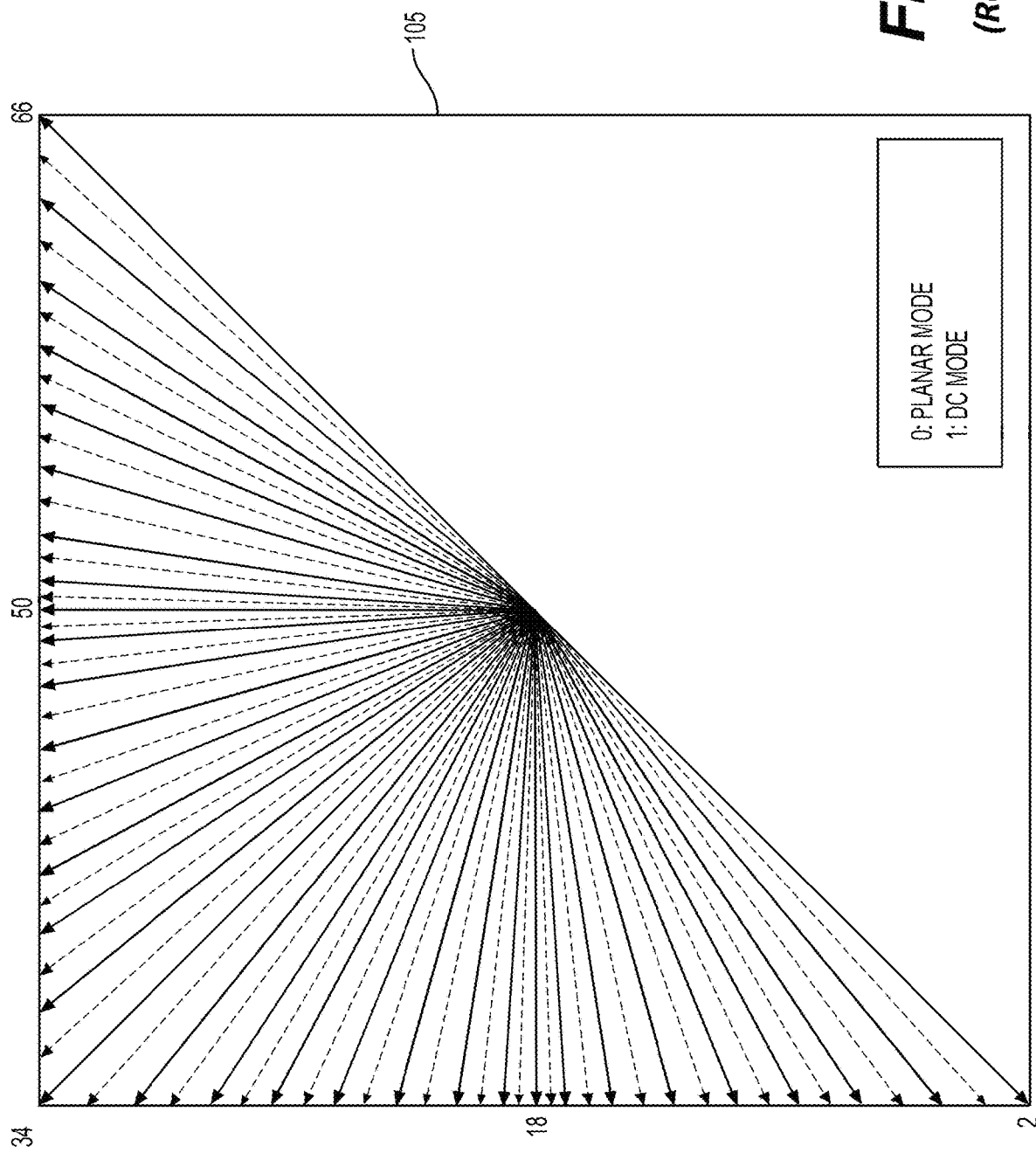
FIG. 1B is an illustration of exemplary intra prediction directions.
Figure 1C:
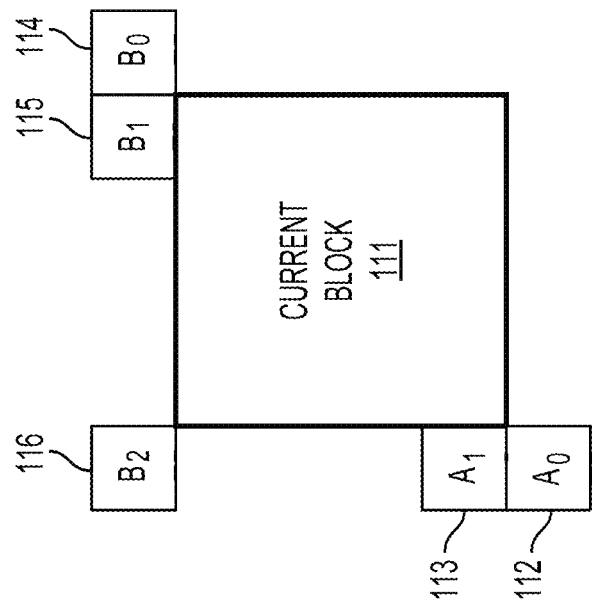
FIG. 1C is a schematic illustration of a current block and its surrounding spatial merge candidates in one example.
Figure 2:
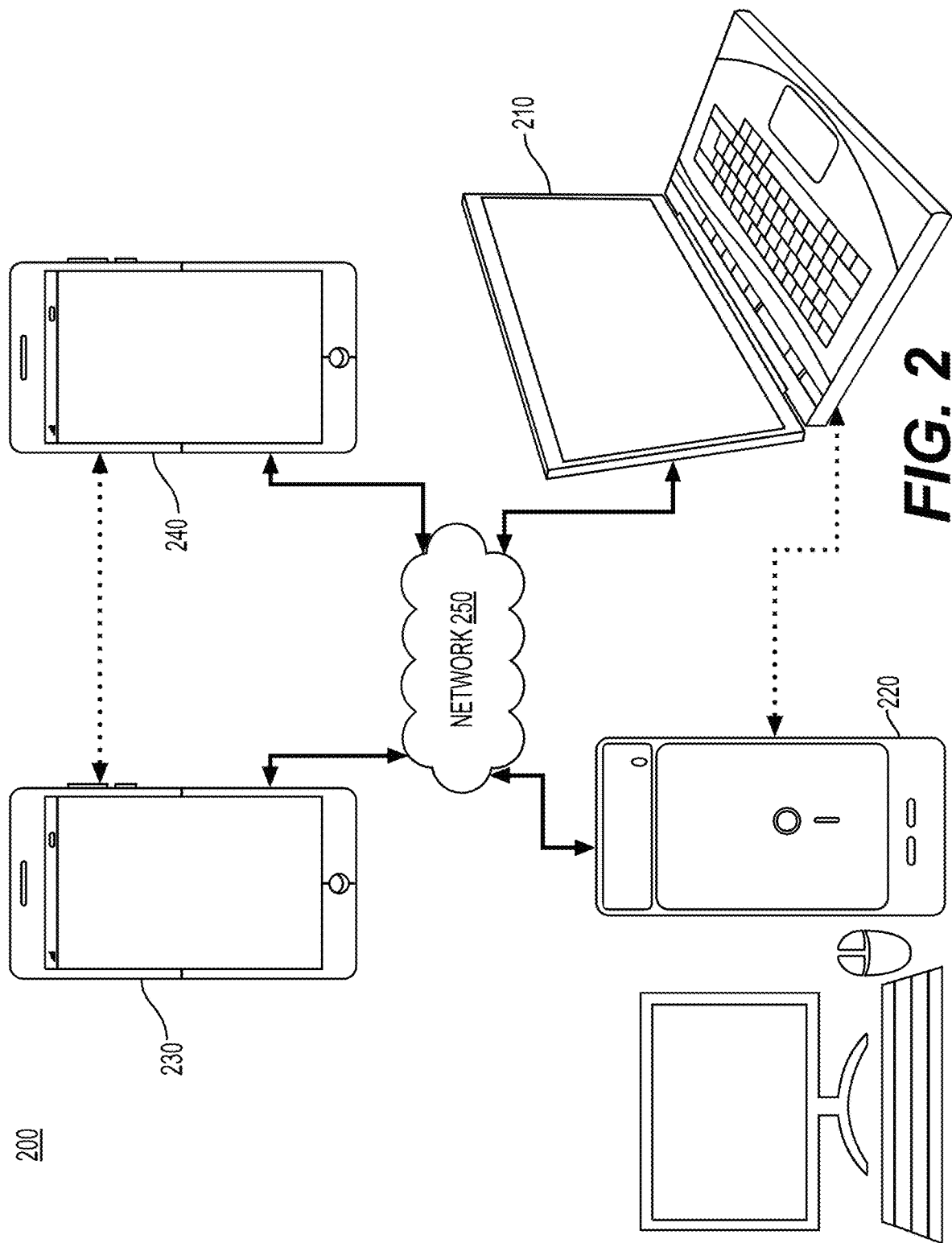
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210)

may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
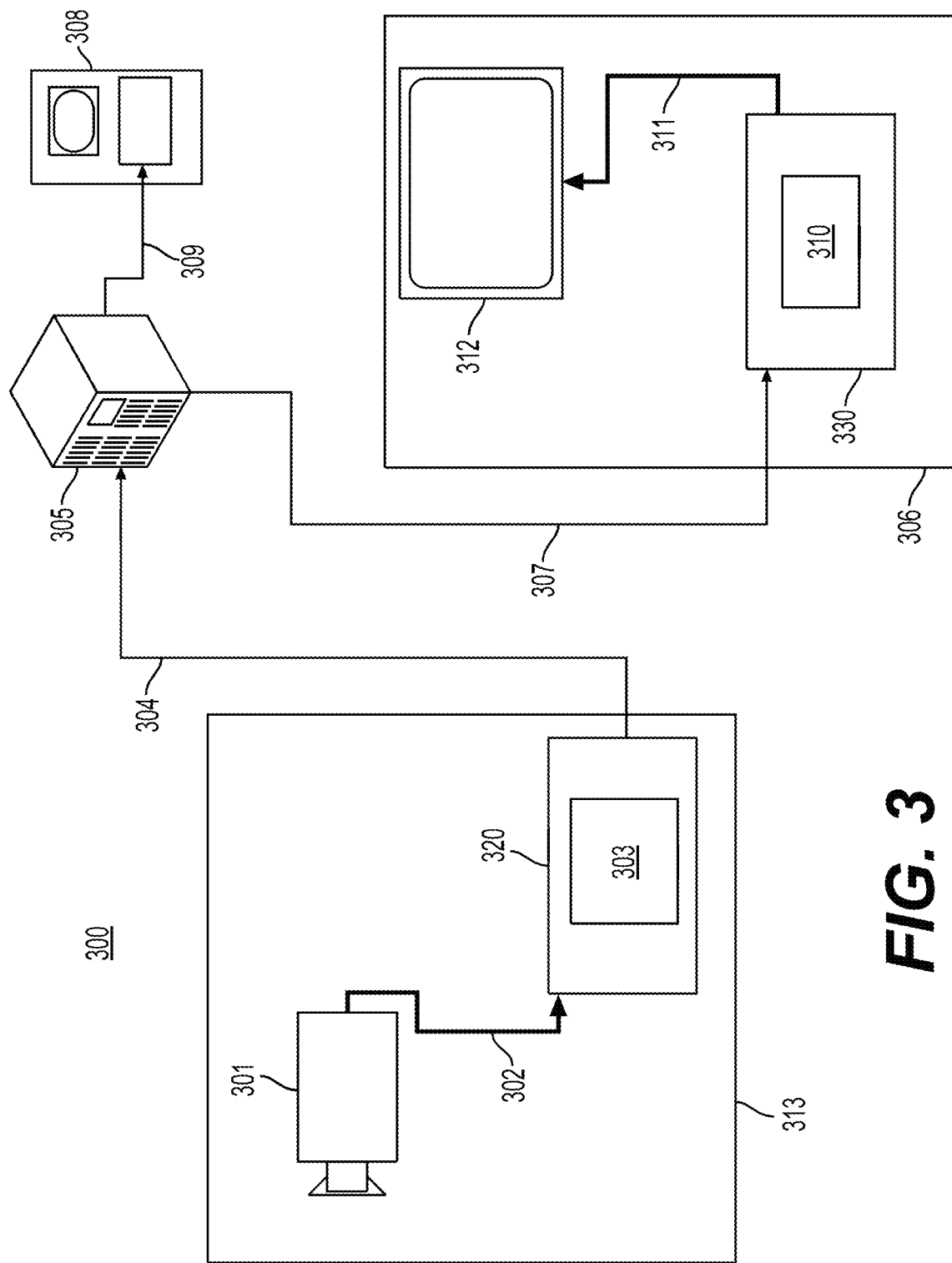
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
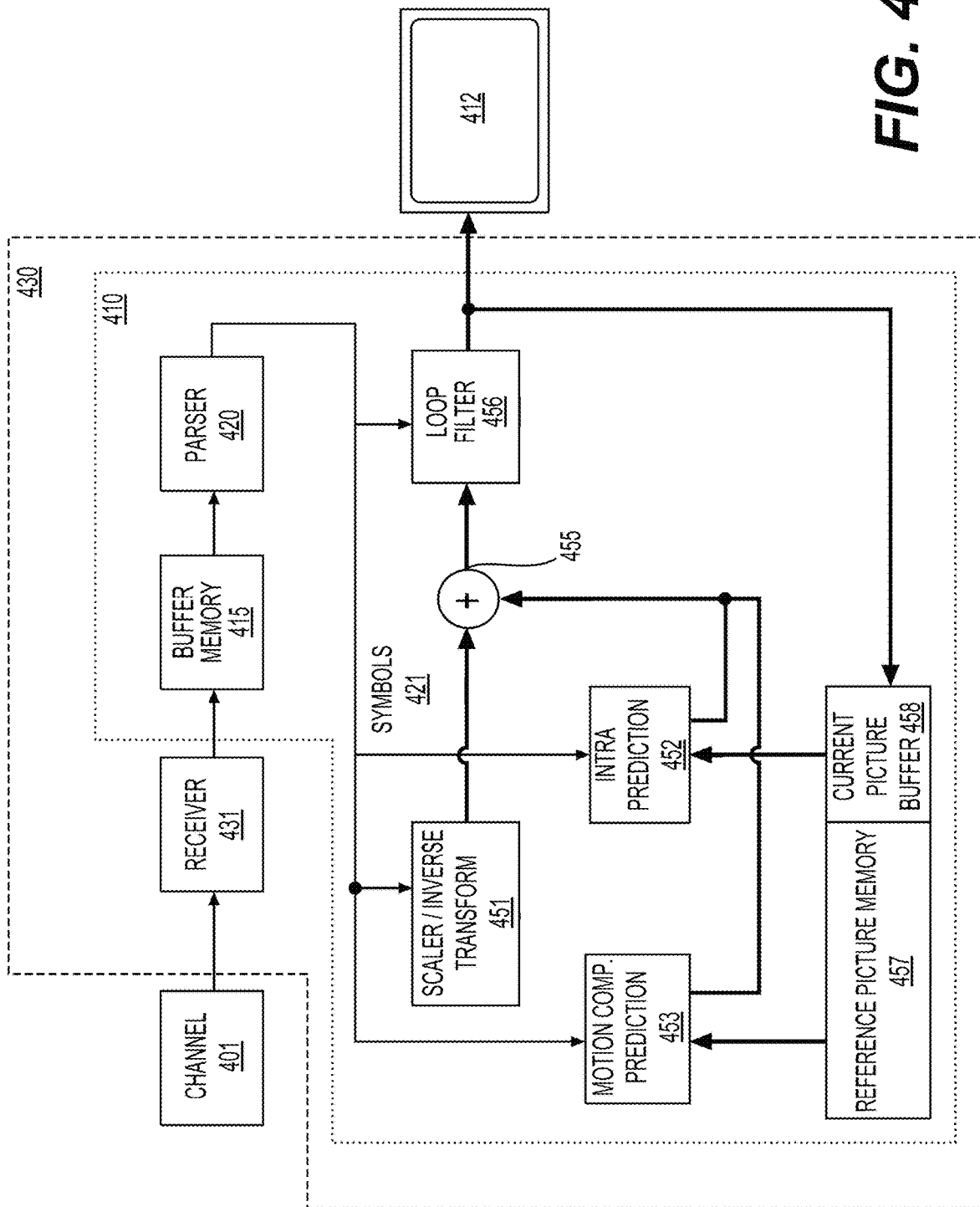
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, MVs, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by MVs, available to the motion compensation prediction unit (453) in the form of symbols (421) that can have, for example X, Y, and reference picture components. Motion compensation also can include interpolation of sample values as fetched from the reference picture memory (457) when sub-sample exact MVs are in use, MV prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD)

specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
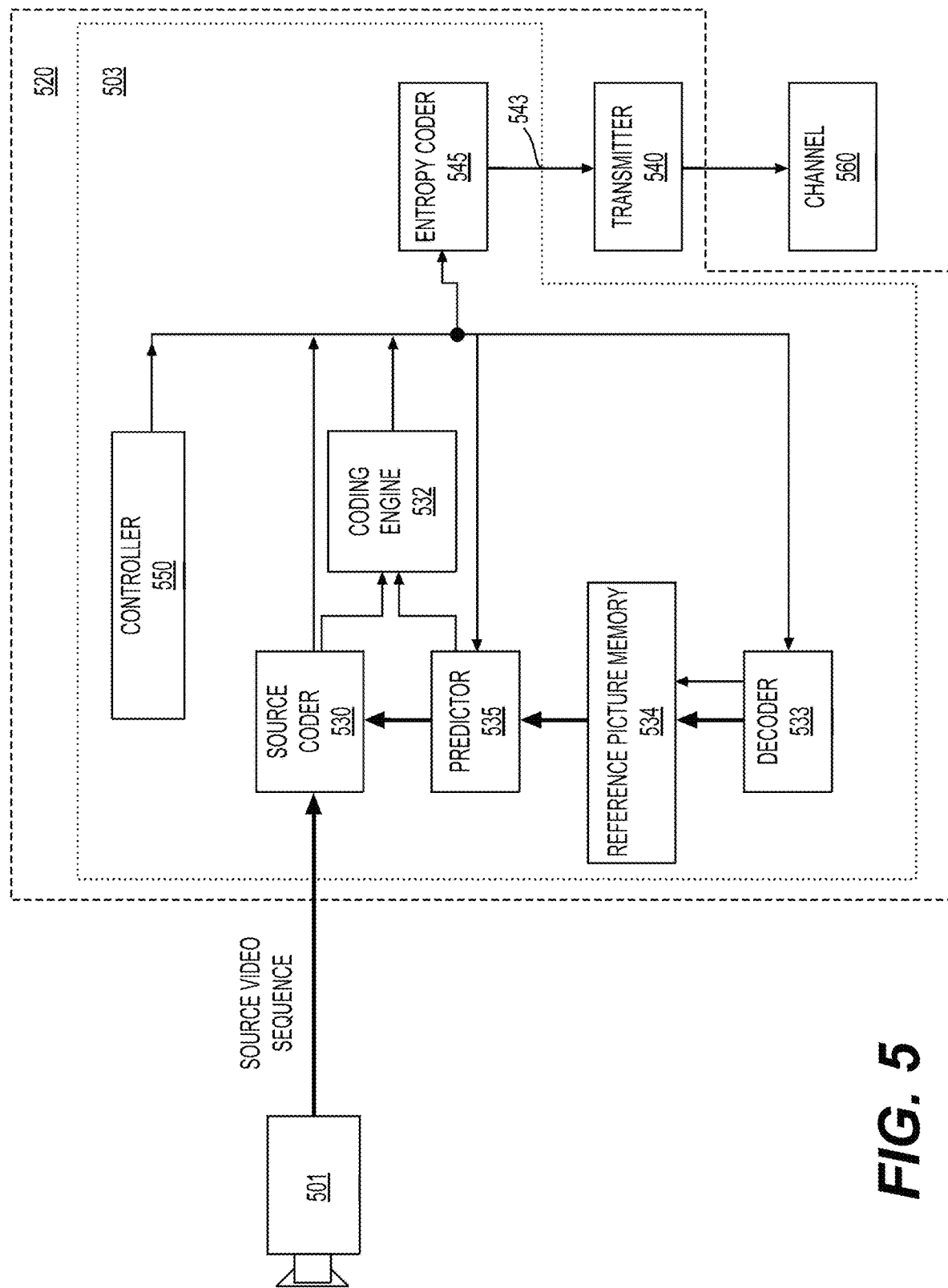
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum MV allowed reference area, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture MVs, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one MV and reference index to predict the sample values of each block.

A bi-directionally predictive picture (B Picture) may be one that may be coded and decoded using intra prediction or inter prediction using at most two MVs and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a MV. The MV points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first MV that points to a first reference block in the first reference picture, and a second MV that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
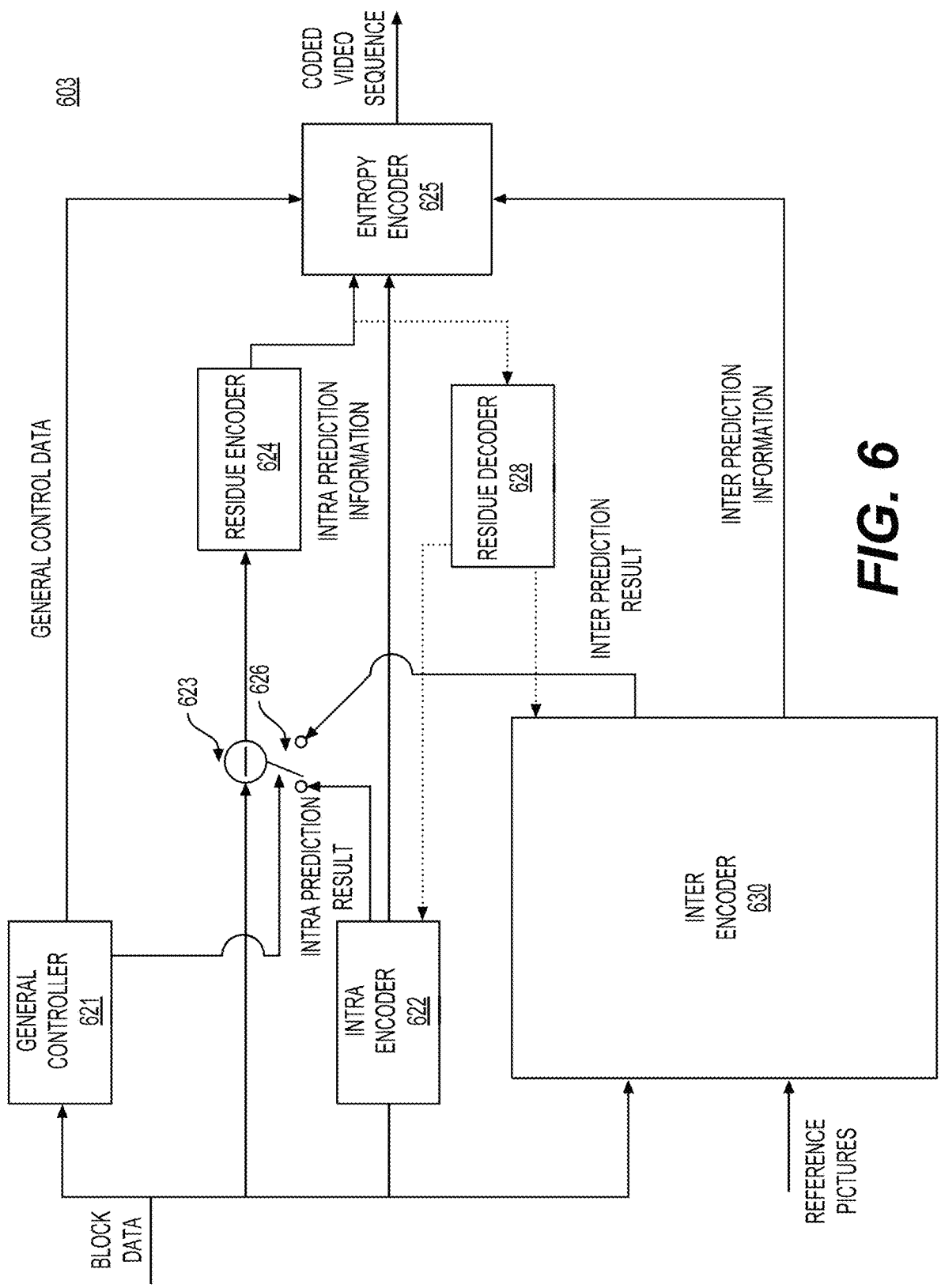
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the MV is derived from one or more MV predictors without the benefit of a coded MV component outside the predictors. In certain other video coding technologies, a MV component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, MVs, merge mode information), and calculate inter prediction results (e.g., prediction block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., prediction block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard such as HEVC. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
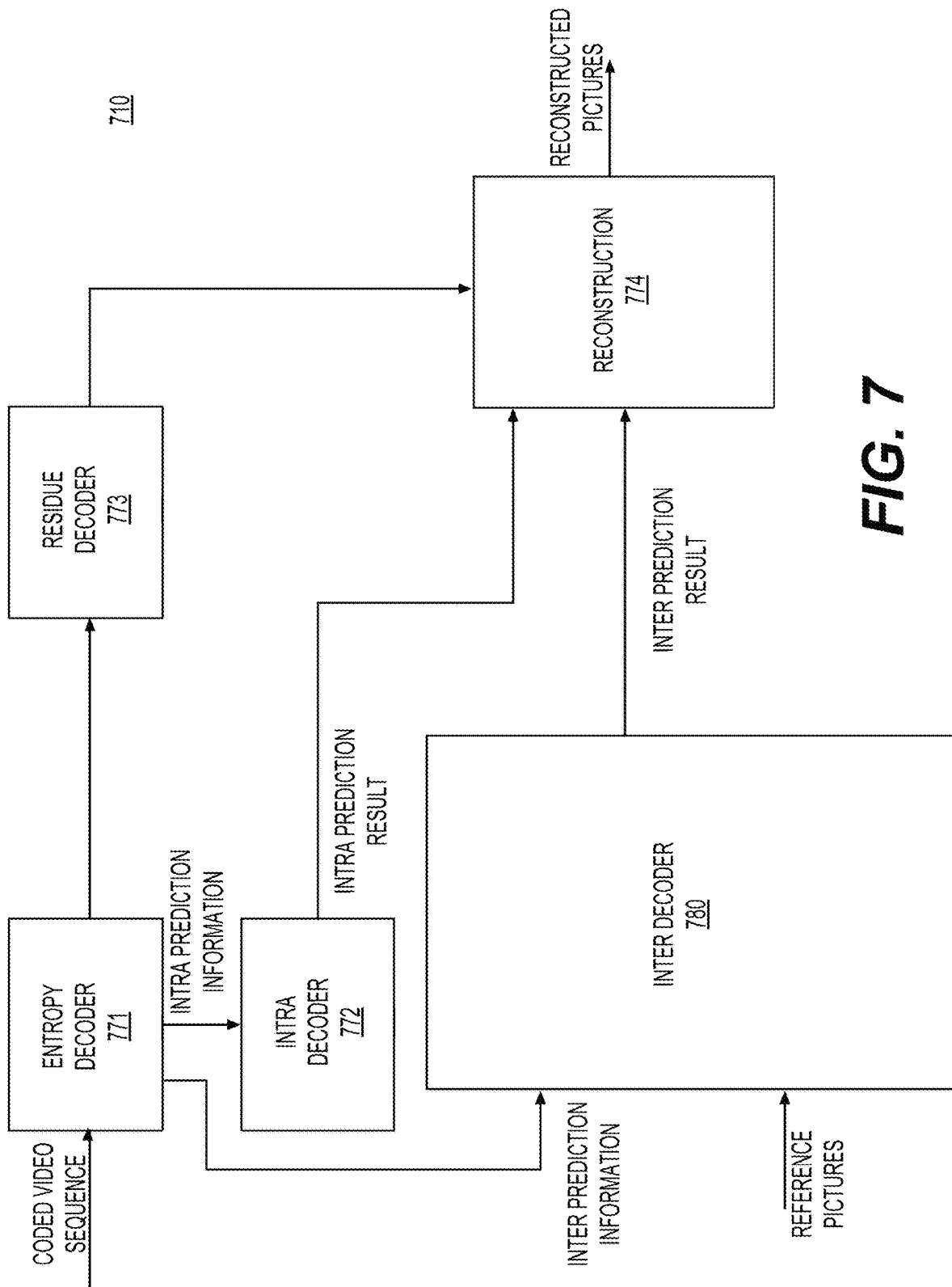
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

II. Affine Motion Compensated Prediction

According to aspects of the disclosure, motion parameters of an inter-predicted CU can include MVs, reference picture indices, reference picture list usage index, and additional information needed for some coding features in standards such as VVC. The motion parameters can be signaled in an explicit or implicit manner. When a CU is coded with a skip mode, the CU can be associated with one PU and have no significant residual coefficients, coded MV delta, or reference picture index. In a merge mode, the motion parameters of the CU can be obtained from neighboring CUs of the CU, including spatial and temporal candidates, and additional schedules introduced in VVC. The merge mode can be applied to any inter-predicted CU, not only for skip mode. An alternative to the merge mode can be an explicit transmission of motion parameters, in which the MVs, corresponding reference picture index for each reference picture list, reference picture list usage flag, and other needed information are signaled explicitly per each CU.

In some related examples such as VVC test model 3 (VTM3), some inter prediction coding tools can be included, such as extended merge prediction, merge mode with MVD (MMVD), affine motion compensated prediction, subblock-based temporal MV prediction (SbTMVP), triangle partition prediction, and combined inter and intra prediction (CIIP).

In some related examples such as HEVC, only a translation motion model can be applied for motion compensation prediction (MCP). While in the real world, there can be many kinds of motion, e.g. zoom in/out, rotation, perspective motions, and other irregular motions. Therefore, in some other related examples such as VVC, a block-based affine transform motion compensation prediction can be applied. The affine motion field of a block can be described by two control point MVs (4-parameter affine model) in FIG. 8A or three control point MVs (6-parameter affine model) in FIG. 8B.

Figure 8B:
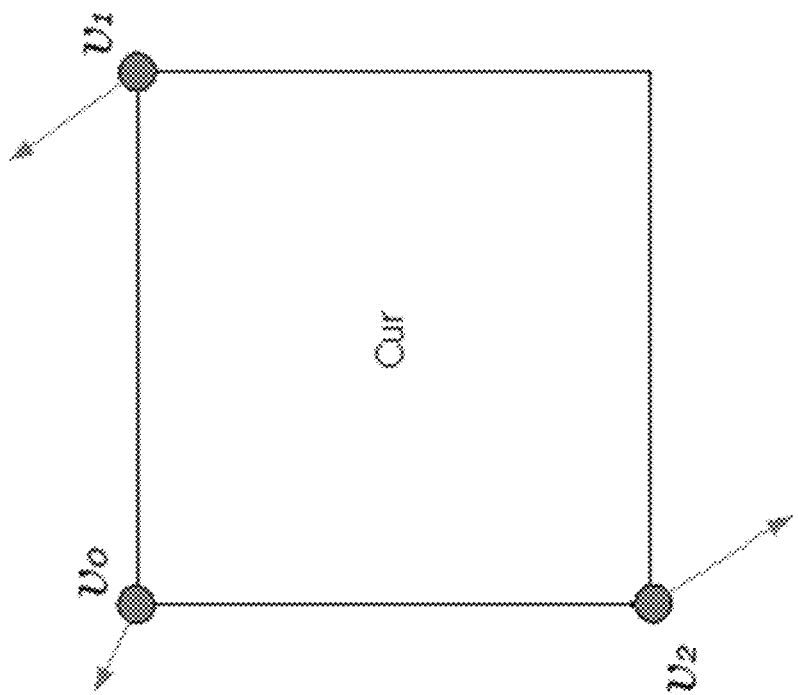
FIGS. 8A and 8B show an exemplary 4-parameter affine model and an exemplary 6-parameter affine model in accordance with an embodiment.
Figure 8A:
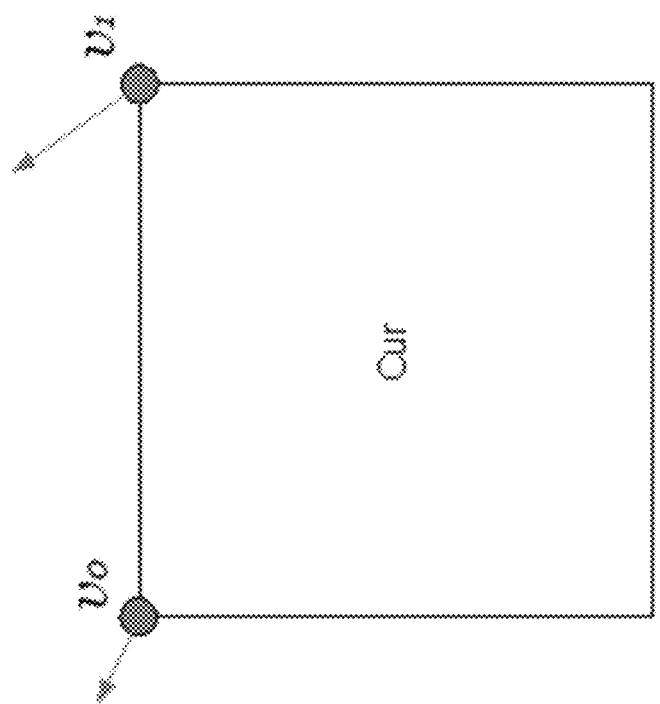

For the 4-parameter affine motion model as shown in FIG. 8A, the MV at a sample location (x, y) in a block can be derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad \text{(Eq. 1)}$$

For the 6-parameter affine motion model as shown in FIG. 8B, the MV at a sample location (x, y) in a block can be derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{(Eq. 2)}$$

where $(mv_{0x}, mv_{0y})$ is the MV of the top-left corner control point in FIGS. 8A and 8B, $(mv_{1x}, mv_{1y})$ is the MV of the top-right corner control point in FIGS. 8A and 8B, and $(mv_{2x}, mv_{2y})$ is the MV of the bottom-left corner control point in FIG. 8B.

Figure 9:
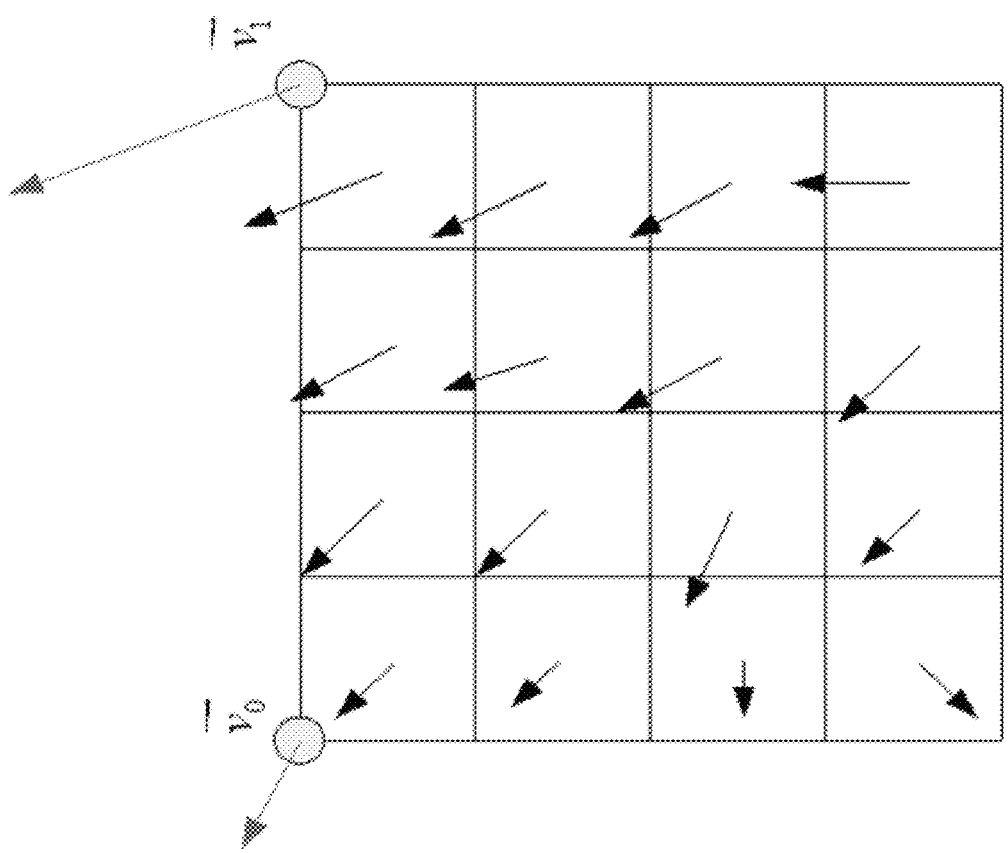
FIG. 9 shows exemplary affine motion vector fields per sub-block in accordance with an embodiment.

In order to simplify the motion compensation prediction, block based affine transform prediction can be applied. To derive an MV of each 4×4 luma sub-block, the MV of the center sample of each sub-block, as shown in FIG. 9, can be calculated according to the above equations, and rounded to 1/16 fraction accuracy. Then the motion compensation interpolation filters can be applied to generate the prediction of each sub-block with the derived MV. The sub-block sizes of chroma-components can also be set to be 4×4. The MV of a 4×4 chroma sub-block can be calculated as an average of MVs of four corresponding 4×4 luma sub-blocks.

According to aspects of the disclosure, there are also two affine motion inter prediction modes: affine merge (AF_MERGE) mode and affine advanced motion vector prediction (AMVP) mode.

III. Affine Merge Prediction

AF_MERGE mode can be applied to a CU of which both width and height can be larger than or equal to a first threshold such as 8. In this mode, the control point MVs (CPMVs) of a current CU can be generated based on the motion information of the spatial neighboring CUs of the current CU. There can be up to five CPMV predictor (CPMVP) candidates and an index can be signaled to indicate one CPMV to be used for the current CU. The following three types of CPMV candidate are used to form the affine merge candidate list: (i) inherited affine merge candidates that are extrapolated from the CPMVs of the neighboring CUs; (ii) constructed affine merge candidates CPMVPs that are derived using the translational MVs of the neighboring CUs; and (iii) zero MVs.

Figure 10:
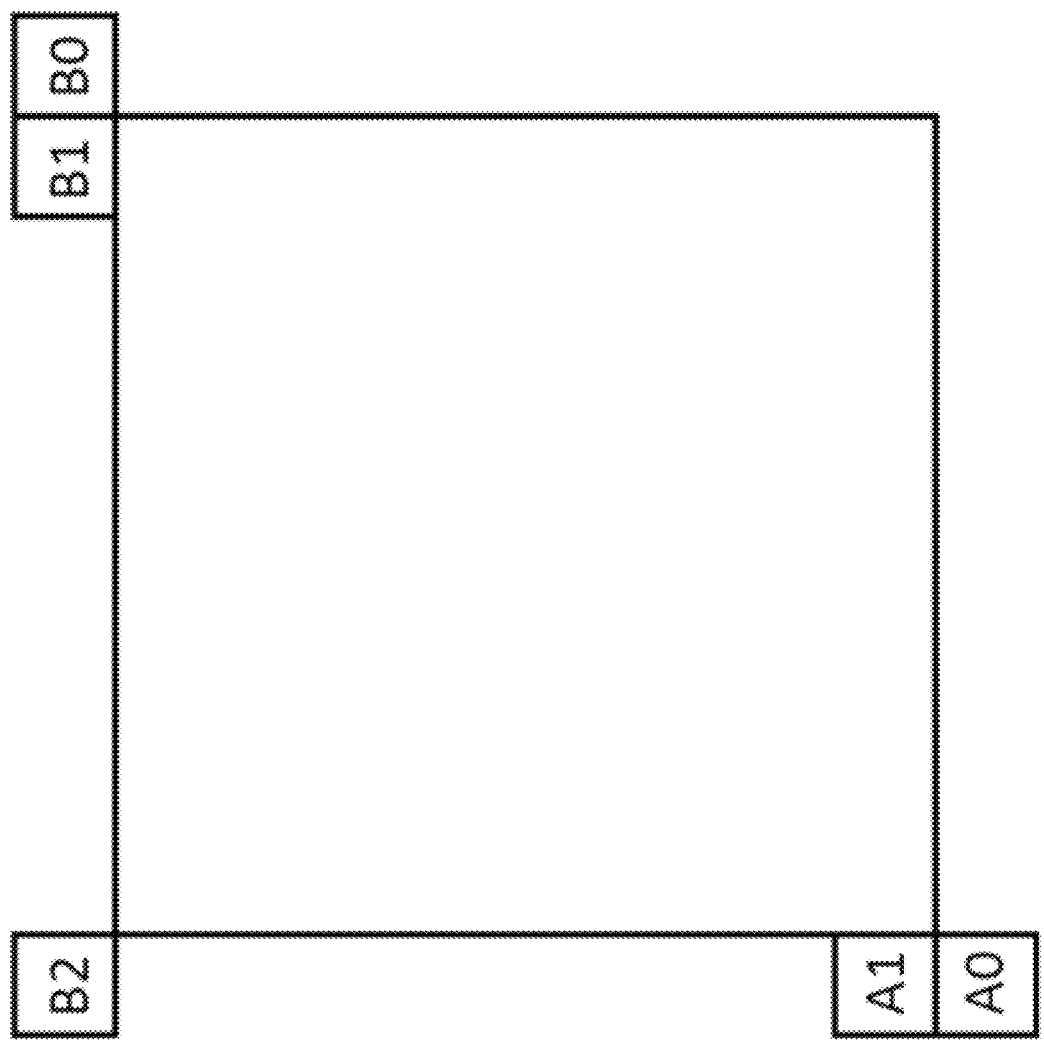
FIG. 10 shows exemplary positions of spatial merge candidates in an affine merge mode in accordance with an embodiment.
Figure 11:
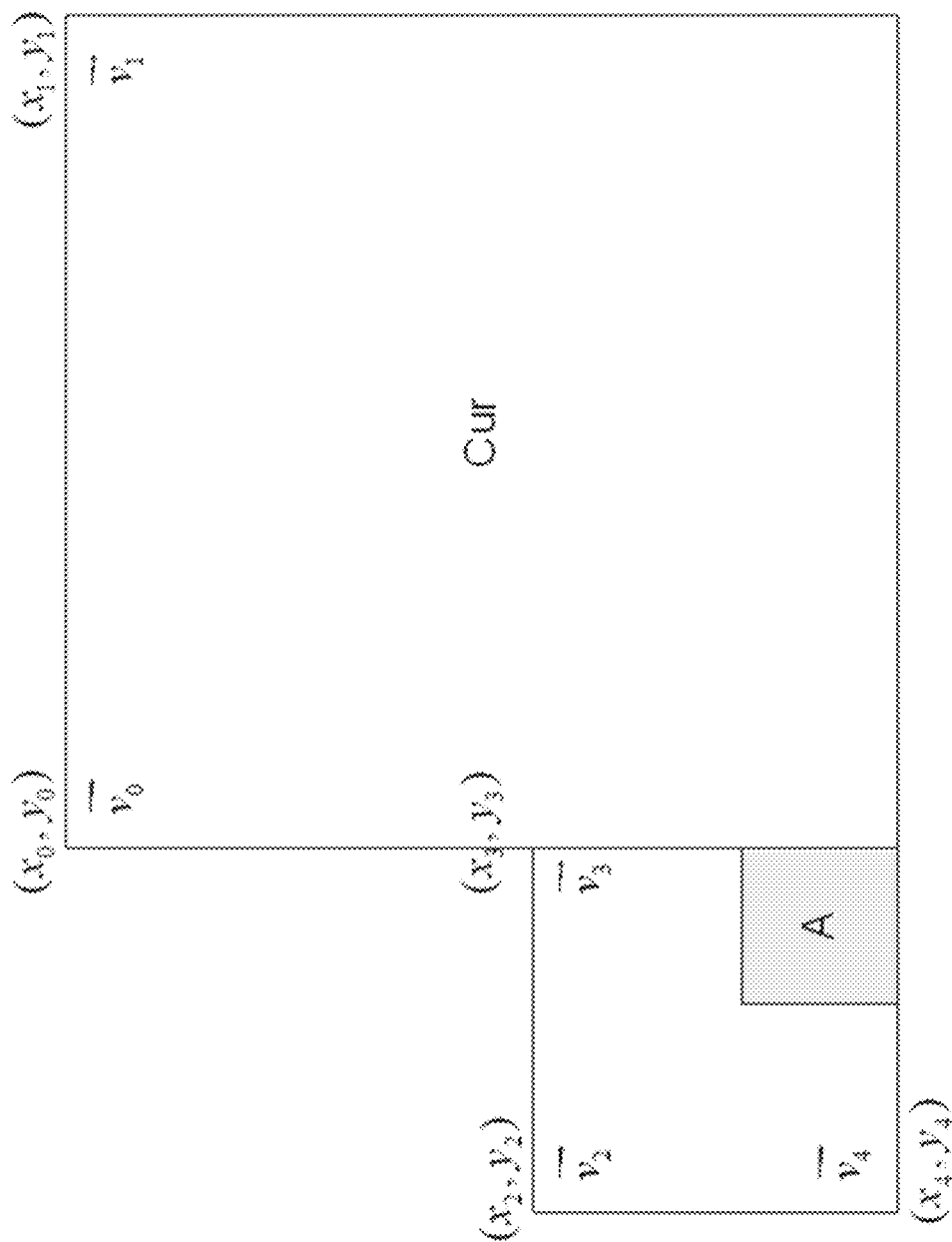
FIG. 11 shows an exemplary control point motion vector inheritance in accordance with an embodiment.

In some related examples such as VVC, there can be a maximum of two inherited affine candidates, which are derived from affine motion model of the neighboring blocks, one from left neighboring CUs and the other one from above neighboring CUs. Exemplary candidate blocks are shown in FIG. 10. In an example, for the left predictor, the scan order can be A0→A1, and for the above predictor, the scan order can be B0→B1→B2. Only the first inherited candidate from each side can be selected. No pruning check is performed between two inherited candidates. When a neighboring affine CU is identified, CPMVs of the neighboring affine CU are used to derive the CPMVP candidate in the affine merge list of the current CU. As shown in FIG. 11, if the neighboring left bottom block A is coded in an affine mode, the MVs $v_2$, $v_3$, and $v_4$ of the top left corner, above right corner, and left bottom corner of the CU which contains the block A are attained, respectively. When the block A is coded with the 4-parameter affine model, the two CPMVs of the current CU are calculated according to $v_2$ and $v_3$. In a case that the block A is coded with the 6-parameter affine model, the three CPMVs of the current CU are calculated according to $v_2$, $v_3$, and $v_4$.

In some related examples, a constructed affine candidate can be constructed by combining the neighbor translational motion information of each control point of the current block. The motion information for the control points can be derived from the specified spatial neighbors and temporal neighbor shown in FIG. 12. $CPMV_k$ (k=1, 2, 3, 4) represents the k-th control point of the current block. For $CPMV_1$, the B2→B3→A2 blocks can be checked and the MV of the first available block can be used. For $CPMV_2$, the B1→B0 blocks can be checked and the MV of the first available block can be used. For $CPMV_3$, the A1→A0 blocks can be checked and the MV of the first available block can be used. For $CPMV_4$, temporal MV predictor (TMVP) can be used if available.

After MVs of the four control points are attained, affine merge candidates are constructed based on the motion information. The following combinations of the control point MVs can be used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of three CPMVs constructs a 6-parameter affine merge candidate and the combination of two CPMVs constructs a 4-parameter affine merge candidate. To avoid motion scaling process, if the reference indices of the control points are different, the related combination of CPMVs is discarded.

After the inherited affine merge candidates and the constructed affine merge candidates are checked, if the merge candidate list is still not full, zero MVs can be inserted to the end of the list.

IV. Affine AMVP Prediction

Affine AMVP mode can be applied to a CU of which both width and height can be larger than or equal to a second threshold such as 16. An affine flag in a CU level can be signaled in the bitstream to indicate whether the affine AMVP mode is used and then another flag can be signaled to indicate either a 4-parameter affine model or a 6-parameter affine model. In the affine AMVP mode, the differences between the CPMVs of the current CU and the corresponding predictors CPMVPs can be signaled in the bitstream. The affine AMVP candidate list size can be 2 and the affine AMVP candidate list can be generated by using the following four types of CPMV candidate in order: (i) inherited affine AMVP candidates that are extrapolated from the CPMVs of the neighboring CUs; (ii) constructed affine AMVP candidates CPMVPs that are derived using the translational MVs of the neighboring CUs; (iii) translational MVs from neighboring CUs; and (iv) zero MVs.

The checking order of the inherited affine AMVP candidates can be the same as the checking order of the inherited affine merge candidates. One difference can be that, for the inherited AMVP candidates, only an affine CU that has the same reference picture as the current block can be considered. No pruning process can be applied when inserting an inherited affine motion predictor into the candidate list.

Figure 12:
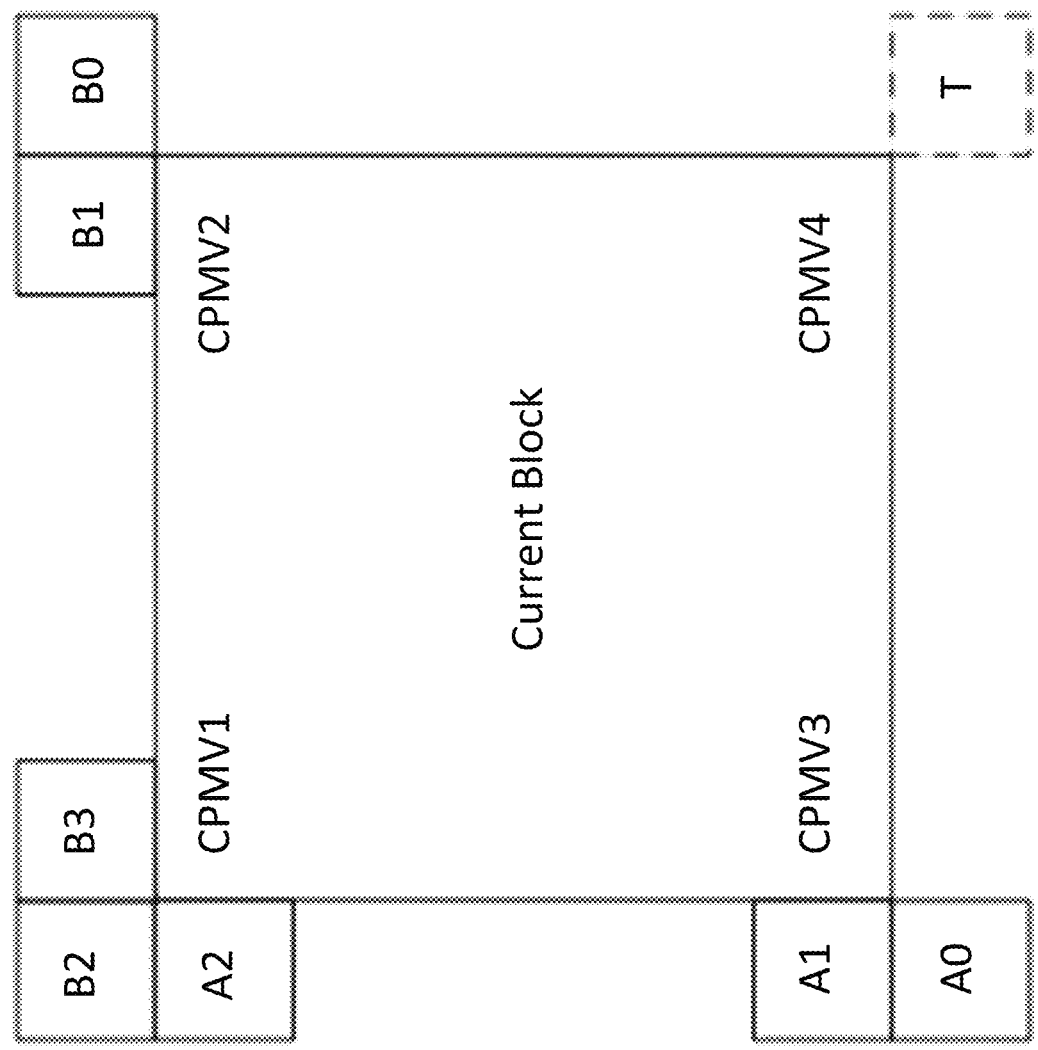
FIG. 12 shows exemplary positions of candidates in a constructed affine merge mode in accordance with an embodiment.

A constructed AMVP candidate can be derived from the specified spatial neighbors shown in FIG. 12. The checking order used in affine merge candidate construction can be used for the constructed AMVP candidate. In addition, a reference picture index of the neighboring block can also be checked. The first block in the checking order that is inter coded and has the same reference picture as the current CUs can be used. There can be only one constructed AMVP candidate. When the current CU is coded with the 4-parameter affine mode and $mv_0$ and $mv_1$ are both available, they are added as one candidate in the affine AMVP list. When the current CU is coded with the 6-parameter affine mode and all three CPMVs are available, they are added as one candidate in the affine AMVP list. Otherwise, the constructed AMVP candidate can be set as unavailable.

If the size of the affine AMVP list candidate list is still less than 2 after the inherited affine AMVP candidates and constructed AMVP candidate are checked, $mv_0$, and $mv_2$ can be added, in order, as the translational MVs to predict all CPMVs of the current CU, when available. Finally, zero MVs are used to fill the affine AMVP list if the list is still not full.

V. Local Illumination Compensation

In some related examples, local illumination compensation (LIC) is used for inter coded CUs. The LIC can be based on a linear model for illumination changes, using a scaling factor a and an offset b. The LIC can be enabled or disabled adaptively for each inter-mode coded CU. The linear model can be described as follows, $$\text{Pred} = a * \text{Ref} + b \qquad \text{(Eq. 3)}$$

When the LIC applies to a CU, a least square error method can be employed to derive the parameters a and b by using the neighboring samples of the current CU and the corresponding reference samples of the neighboring samples, as described in Eq. 4.

$$(a,b) = \arg\min\{(Rec_T - (a*\text{Ref}_T + b))^2\} \qquad \text{(Eq. 4)}$$

Figure 13:
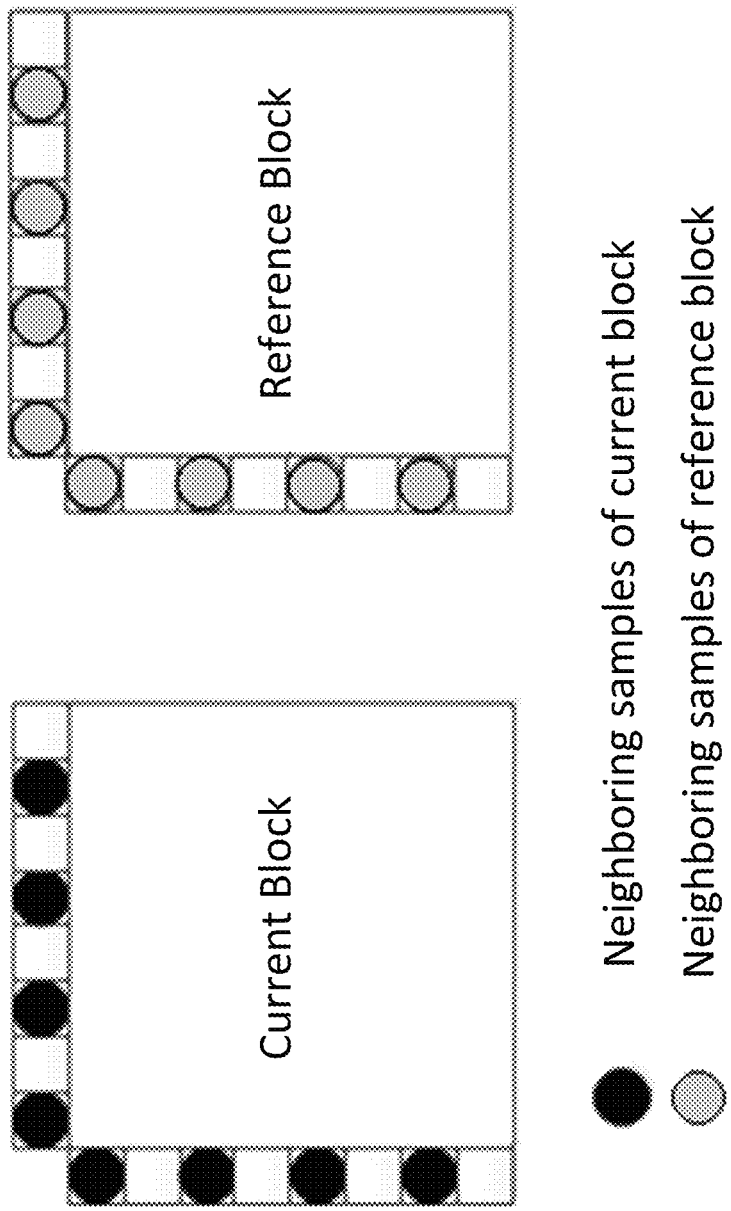
FIG. 13 shows exemplary neighbouring samples used for deriving local illumination compensation (LIC) parameters in accordance with an embodiment.

For example, as illustrated in FIG. 13, the subsampled (2:1 subsampling) neighboring samples of the current CU and the corresponding reference samples (identified by motion information of the current CU or sub-CU) in the reference picture are used. The LIC parameters can be derived and applied for each prediction direction separately.

When a CU is coded in a merge mode, an LIC flag can be copied from neighboring blocks of the CU, in a way similar to motion information copy in a merge mode; otherwise, the LIC flag can be signaled for the CU to indicate whether the LIC can be applied or not.

When the LIC is enabled for a picture, an additional CU level rate-distortion (RD) check can be performed to determine whether the LIC is applied or not to a CU. When the LIC is enabled for the CU, mean-removed sum of absolute difference (MR-SAD) and mean-removed sum of absolute Hadamard-transformed difference (MR-SATD) can be used, instead of sum of absolute difference (SAD) and sum of absolute Hadamard-transformed difference (SATD), for integer pel motion search and fractional pel motion search, respectively.

In some related examples, a uni-directional LIC can be used. In the uni-directional LIC, the linear model parameters derivation can be kept unchanged and the process can be applied on a CU basis. The uni-directional LIC may not be applied to sub-block based inter prediction, such as ATMVP, affine motion compensated prediction, triangular partition, multi hypothesis intra inter, or bi-directional prediction.

Figure 14:
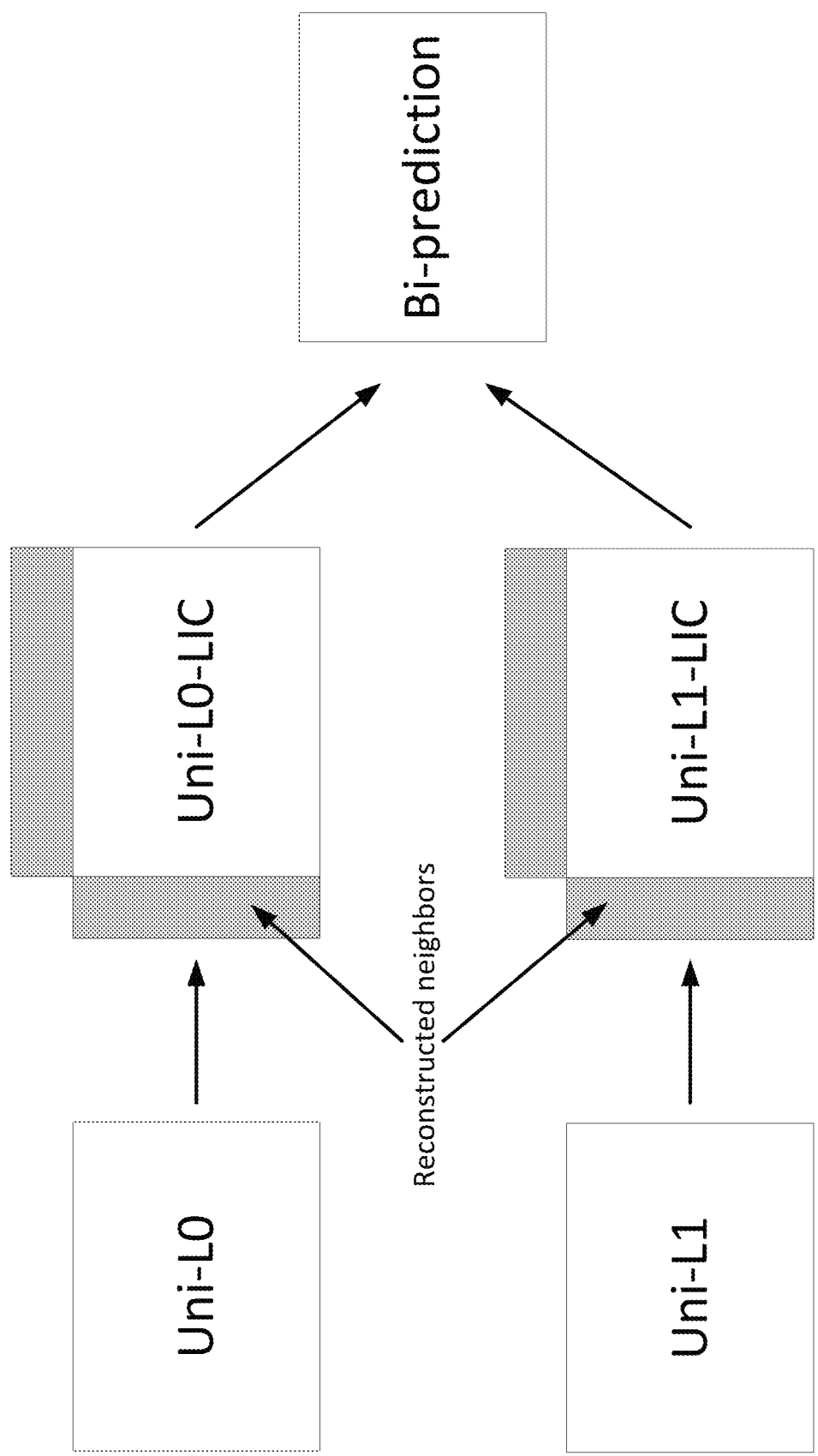
FIG. 14 shows an exemplary LIC with a bi-prediction in accordance with an embodiment.

The uni-directional LIC is not applied to the bi-directional prediction, since the reconstructed neighboring samples of the current block are not required to perform inter prediction in the inter pipeline and thus are not available for each uni-directional inter prediction, which otherwise would be required for the LIC process since the weighted average for bi-prediction is applied after deriving uni-directional predictors. In addition, applying the LIC process to the bi-directional prediction can introduce an additional stage due to performing the LIC process before the weighting. FIG. 14 shows an exemplary LIC process with bi-prediction.

Figure 15:
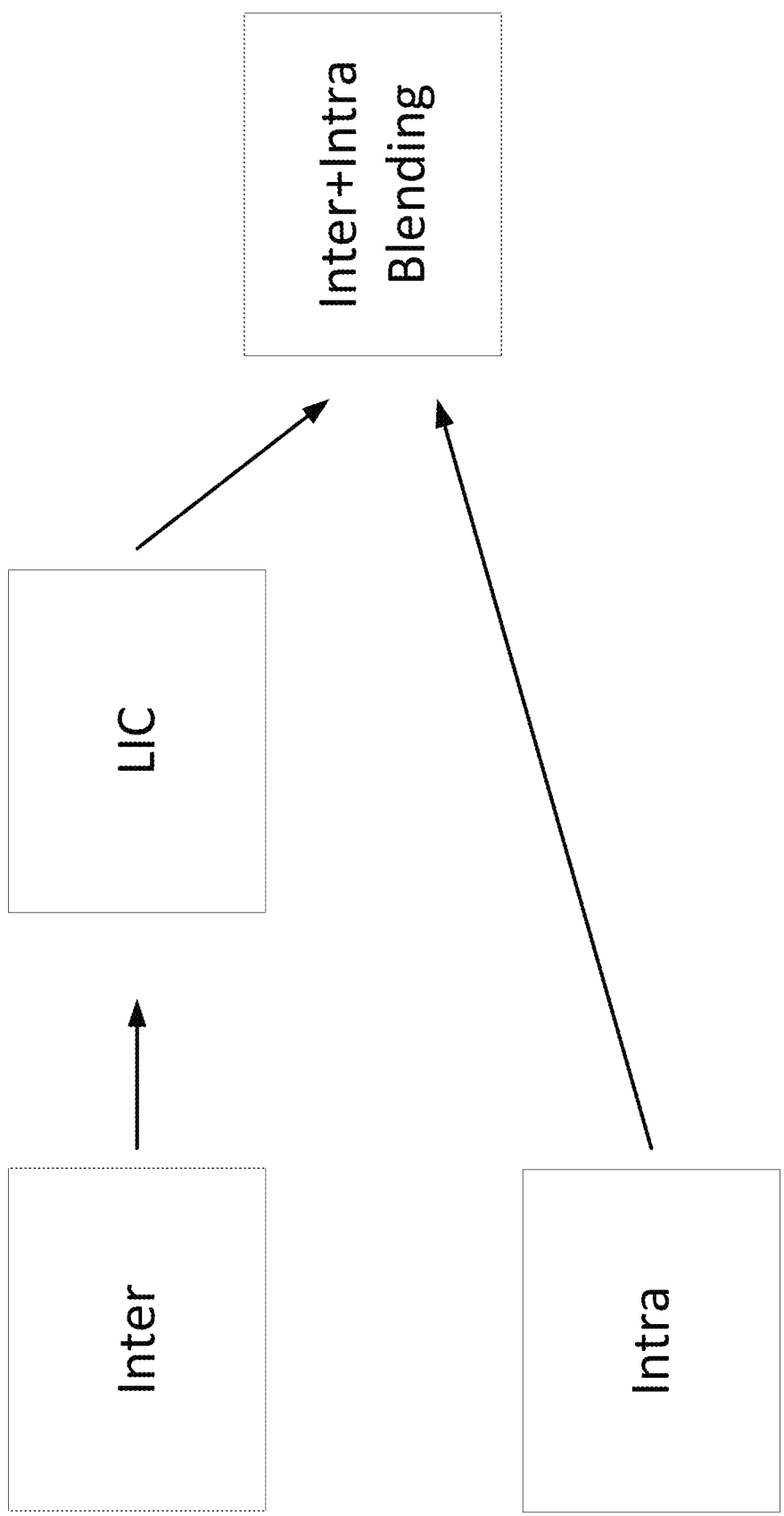
FIG. 15 shows an exemplary LIC with multi-hypothesis intra inter prediction in accordance with an embodiment.

For the same reasoning, the uni-directional LIC is not applied to the multi hypothesis intra inter because the LIC process is applied after inter prediction and the weighting between intra prediction and inter prediction can be delayed by the LIC process. FIG. 15 shows an exemplary LIC process with multi hypothesis intra inter.

The LIC flag can be included as a part of motion information in addition to MVs and reference indices. However, when the merge candidate list is constructed, the LIC flag can be inherited from the neighbor blocks for merge candidates. The LIC is not used for motion vector pruning for a simplification purpose.

The LIC flag is not stored in the motion vector buffer of the reference picture, so the LIC flag is always set as false for TMVP. The LIC flag is also set equal to false for bi-directional merge candidates, such as par-wise average candidate and zero motion candidates.

When the LIC tool is not applied, the LIC flag is not signaled.

In some related examples, the LIC can be extended to affine coded CUs. The derivation of linear model parameters can be kept unchanged and three methods can be used for fetching the reference samples of an affine coded CU.

Figure 16:
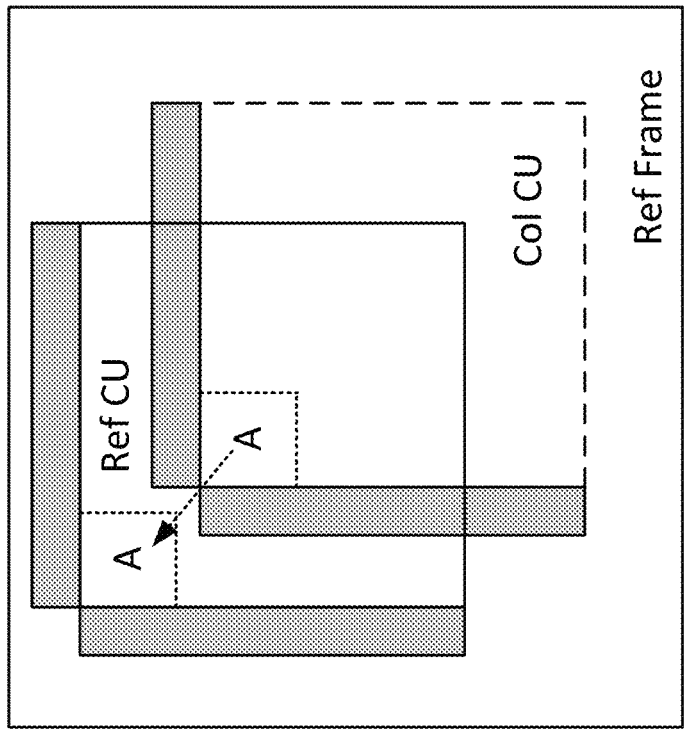
FIG. 16 shows exemplary reference samples fetched for an affine coded block when LIC is applied to the affine coded block in accordance with an embodiment.
Figure 16:
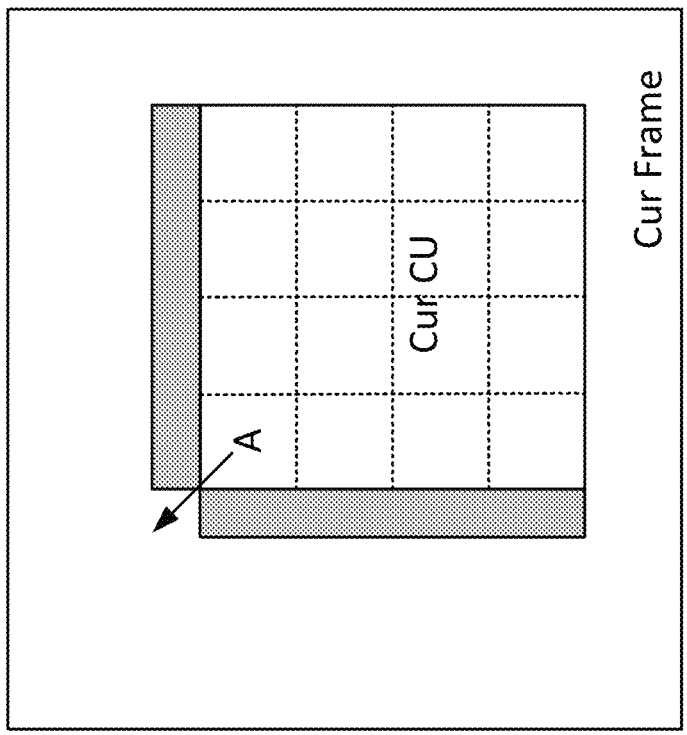

In method one, as shown in FIG. 16, the top-left sub-block MV of the affine coded CU can be used for fetching the reference samples of the whole CU.

Figure 17:
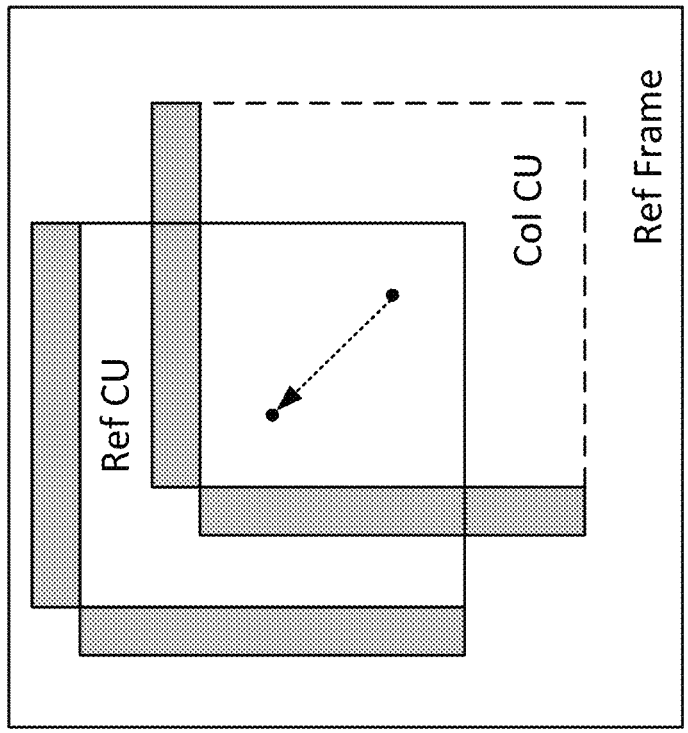
FIG. 17 shows exemplary reference samples fetched for the affine coded block when LIC is applied to the affine coded block in accordance with another embodiment.
Figure 17:
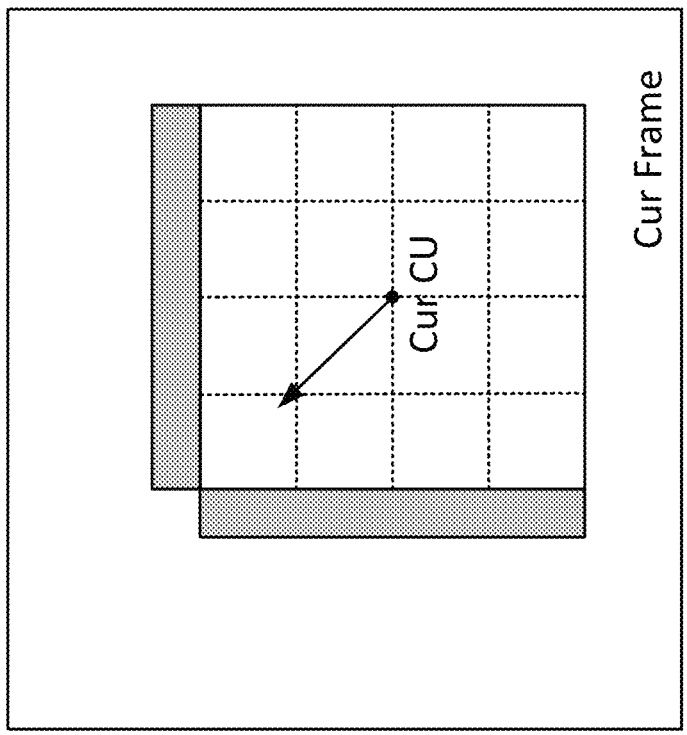

In method two, as shown in FIG. 17, the central sub-block MV of the affine coded CU can be used for fetching the reference samples of the whole CU.

Figure 18:
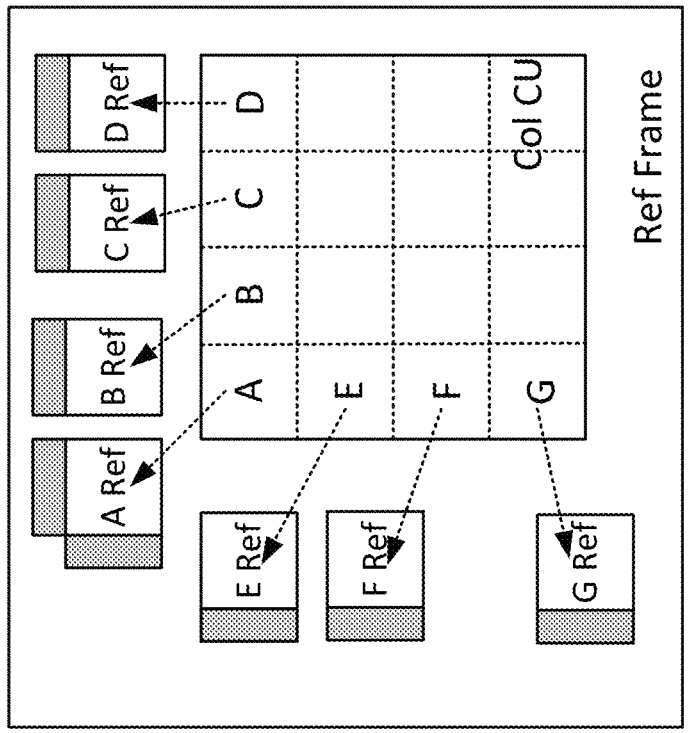
FIG. 18 shows exemplary reference samples fetched for the affine coded block when LIC is applied to the affine coded block in accordance with another embodiment.
Figure 18:
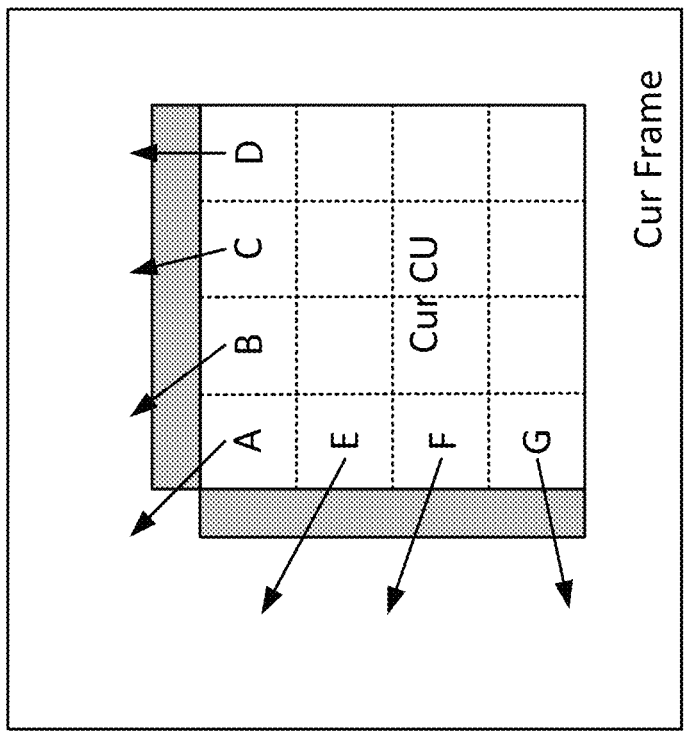

In method three, as shown in FIG. 18, the reference samples in the top template can be fetched by each sub-block MVs in a top row and the reference samples in the left template can be fetched by each sub-block MVs in a left column.

VI. Local Weighted Prediction

According to aspects of the disclosure, the LIC can provide good coding efficiency improvement on certain video contents. However, costs can include increased complexity and operations on both the encoder and decoder sides, as the LIC parameters need to be derived and additional encoder searches are necessary. Another issue is that the LIC can introduce a dependency between the LIC parameter derivation of the current block and the reconstruction of the spatial neighbors of the current block, which is not beneficial for a hardware implementation.

This disclosure presents a local weighted prediction (LWP) for reducing the complexity and removing the dependency between the parameter derivation and the reconstruction of the neighbors of the current block. In an embodiment, the LWP can derive a prediction output of a CU from a reference block of the CU using a linear model with a scaling parameter and/or an offset parameter. Different from the LIC, the scaling parameter and/or the offset parameter in the LWP may not be derived from templates and can be signaled.

According to aspects of the disclosure, when the LWP is applied to a CU, the scaling parameter and/or the offset parameter can be signaled without derivation. The signaled parameter(s) can be used in the linear transform from the reference samples to the prediction output. In an example, a can denote the scaling parameter and b can denote the offset parameter, and the prediction samples Pred can be generated from the reference samples Ref in Eq. 5, where a and b can be signaled in the bitstream.

$$\text{Pred}=a*\text{Ref}+b \qquad (\text{Eq. 5})$$

In one embodiment, the LWP can be applied to all inter-predicted coding blocks.

In one embodiment, the LWP can only be applied when the current block is coded in an inter merge/skip mode.

In one embodiment, the LWP can be applied when the current block is coded in a non-subblock based inter prediction mode. That is, subblock based inter prediction modes, such as SbTMVP or affine inter prediction, may not be applicable to the LWP.

According to aspects of the disclosure, a first flag such as a usage flag or an LWP flag can be signaled for a coding block to indicate whether the LWP is applied.

In some embodiments, when the current block is coded in an inter merge/skip mode, a value of the usage flag or the LWP flag of the current block can be inherited from a value of an usage flag or an LWP flag of a merge candidate of the current block. In an embodiment, the usage flag or the LWP flag can only be inherited from a spatial neighboring merge candidate of the current block.

According to aspects of the disclosure, the scaling parameter and/or the offset parameter can include a magnitude value and a sign bit that indicates a sign of the magnitude value. The scaling parameter and the offset parameter each can have a signaled corresponding magnitude value and a signaled corresponding sign bit.

In one embodiment, the magnitude value can have a dynamic range of M bits. For example, M can be equal to 3.

In one embodiment, the magnitude value can only have a value in power of 2, e.g., $2^N$, such that the power can be signaled instead of the magnitude value for the current block. For example, N can be equal to 4.

In one embodiment, the magnitude value can have a value of 0 or a value that is a power of 2.

In one embodiment, the magnitude value can be signaled in bitstream, such as in a sequence parameter set (SPS), a picture parameter set (PPS), a picture header (PH), or a slice header.

In one embodiment, a scaling parameter delta relative to a scaling factor of one can be signaled such that delta 0 indicates the scaling factor of one. It is noted that the scaling factor of one can be based on a predefined precision. For example, the value of the scaling factor of one can be 32 if a 5-bit precision is used.

According to aspects of the disclosure, only a limited number of scaling factor values and/or offset values are allowed for blocks using the LWP. For example, a scaling parameter table and/or an offset parameter table can be predefined or signaled, such as in a slice level or above. An index to the predefined or signaled scaling table and/or an index to the predefined or signaled offset table can be signaled for the coding block when the LWP is enabled.

In one embodiment, a prediction flag can be signaled at a high level header (e.g., slice header, PH, or PPS, etc.) to indicate that the parameter tables used in the current header can be predicted from a previous header. In one example, if the prediction flag is signaled in a slice header and with the value of the prediction flag being true, the values of the scaling parameter table and/or the offset parameter table can be derived from a previous slice, instead of being signaled at the current slice header.

In some embodiments, values in the scaling parameter table and/or offset parameter table can be linear, exponential, non-linear, or non-exponential.

In one embodiment, the scaling parameter table can be predefined as follows where the 5-bit precision is used (value 32 is scaling factor one): [2, 4, 8, 16, 32, 64, 128, 256].

In one embodiment, the offset parameter table can be predefined as follows where the 5-bit precision is used: [−128, −96, −64, −32, 0, 32, 64, 96]. Alternatively, the offset parameter table can be defined as [−256, −128, −64, −32, 0, 32, 64, 128, 256].

In one embodiment, a scaling parameter delta table can be predefined as follows where the 5-bit precision is used (value 32 is a scaling factor of one). In one example, the scaling parameter delta table can be predefined as [0, 1, 2, 4, 8, 16, 32, 64]. In another example, the scaling parameter delta table can be predefined as [0, 1, 2, 3, 4, 5, 6, 7]. A scaling parameter delta index can be used to indicate which entry to be used as the magnitude of the scaling parameter delta value. When the entry value is greater than zero and less than 32, an additional sign bit can be signaled to determine the sign of the delta value. When the entry value is equal to 0 or greater than or equal to 32, the sign can be inferred to be non-negative. The final scaling value is the sum of 32 and the signed delta value.

In one example, a scaling parameter table with signed values can be predefined, e.g., [0, 1, −1, 2, −2, 4, −4, 8, −8, 16, −16, 32, 48, 64, 128], and the selected entry can be signaled by an index.

In one embodiment, fixed-length coding can be used for the index (or indices) of the scaling parameter table and/or the offset parameter table. Alternatively, variable length coding (e.g., truncated binary or truncated unary coding) or signed/unsigned Exponential-Golomb coding can be used for the index (or indices) of the scaling parameter table, the offset parameter table, and/or the scaling parameter delta table.

In one embodiment, when the current block is coded in an inter merge/skip mode, the scaling parameter and offset parameter of the LWP can be inherited from a merge candidate of the current block.

In one embodiment, the LWP parameters can only be inherited from a spatial neighboring merge candidate of the current block.

In one embodiment, the LWP parameters may not be directly inherited but can be signaled as delta values to the LWP parameters (or weight parameters) of a merge candidate of the current block. The LWP parameters of the current block can then be derived by adding the signaled delta values of the scaling factor and offset to the LWP parameters (e.g., scaling factor and offset) of the merge candidate.

According to aspects of the disclosure, a second flag such as an additional partial information signaling flag can be signaled at the block level to indicate that one of the scaling factor and the offset value can be determined as a default value. For example, the default values for the scaling factor and the offset value can be 1 and 0, respectively.

In one embodiment, the second flag at the block level can be signaled to indicate that either the scaling factor or the offset value is signaled or derived from the neighboring block of the current, but not both. The other one can be determined as the default value (e.g., 1 for the scaling factor and 0 for the offset value). For example, the second flag can be scaling_factor_flag. When scaling_factor_flag is set as 1, it indicates that the scaling factor is signaled or derived from a neighboring block and the offset value is set as 0. When scaling_factor_flag is set as 0, it indicates that the offset value is signaled or derived from the neighboring block and the scaling factor is set as 1. The derivation of the LWP parameters from the neighboring block can be based on the derivation of the LIC parameters.

In one embodiment, the second flag at the block level can be signaled to indicate that only the offset value can be signaled or derived from the neighboring block of the current block and the scaling factor can be set as 1. For example, the second flag can be offset_value_flag. When offset_value_flag is set as 1, it indicates that the offset value is signaled or derived from the neighboring block and the scaling factor is set as 1. When offset_value_flag is set as 0, it indicates that both the scaling parameter and the offset value can be signaled or derived from the neighboring block. The derivation of the LWP parameters from the neighboring block can be based on the derivation of the LIC parameters.

In one embodiment, when the current block is coded in an inter merge/skip mode, the second flag such as the partial information signaling flag can be inherited from a corresponding flag associated with a merge candidate of the current block.

In one embodiment, the scaling factor can be coded as a difference to a previously coded scaling factor and the offset value can be coded as a difference to a previously coded offset value.

In one embodiment, each LWP parameter difference can be coded with respect to the corresponding LWP parameter of a spatial neighboring block or a merge candidate of the current block.

In one embodiment, the values of the LWP parameters can be signaled at a slice, wavefront parallel processing (WPP), tile, and/or CTU level, such as the LWP parameters can be applied to all CBs in the level.

In one embodiment, the LWP parameter difference can be coded with respect to the default values (e.g., 1 for the scaling factor and 0 for the offset value) of the LWP parameters. The LWP parameter difference can be signaled at a slice, WPP, tile, and/or CTU level for example.

According to aspects of the disclosure, a bidirectional block or bi-predicted block can have two prediction blocks each corresponding to one prediction direction. The two prediction blocks can be averaged to derive a final prediction block for the bidirectional block. When the LWP is applied to the bidirectional block, the LWP process can be applied to either before the averaging or after the averaging.

In one embodiment, for the bidirectional block, two sets of LWP parameters can be applied to the two prediction blocks of the bidirectional block before the averaging. Each set of LWP parameters can correspond to one prediction block. For example, two scaling factors and two offset values can be signaled for the bidirectional block, and one scaling factor and one offset value correspond to one prediction direction.

In one embodiment, when an LWP parameter for the bidirectional block is signaled as a delta value to another block such as a neighboring block or a merge candidate, the two prediction blocks can be derived by using different blocks to which the delta value is applied.

In one embodiment, when the bidirectional block is a merge/skip mode, the LWP parameter differences can be signaled for the scaling parameter and the offset parameter respectively. For example, one set of parameter differences can be applied to the corresponding LWP parameters of the merge candidate, respectively, on each prediction direction (corresponding to each reference list).

In one embodiment, when the two reference pictures of the bidirectional block are on the same side of the current picture including the bidirectional block, the signaled LWP parameter differences can be applied to the two prediction directions in the same way on the scaling parameter and the offset parameter, respectively.

In one embodiment, when the two reference pictures of the bidirectional block are on different sides of the current picture, the signaled LWP parameter differences can be applied to one prediction direction on the scaling parameter and/or the offset parameter, respectively.

In one embodiment, the signaled difference of the offset parameter with a reversed sign can be applied to the other prediction direction on the offset parameter. In one example, the signaled difference can be applied to the L0 prediction direction corresponding to a reference list L0. In another example, the signaled difference can be applied to the L1 prediction direction corresponding to a reference list L1.

In one embodiment, the signaled difference of the scaling parameter can be used to derive the scaling factors for the two prediction directions. For example, deltaScale can be denoted as the signaled scaling parameter delta value and defaultScale can be denoted as the default scaling factor one. In case of a 5-bit precision, defaultScale is equal to 32. $scale_{L0}$ can be denoted as the scaling parameter on the L0 prediction direction and $scale_{L1}$ can be denoted as the scaling parameter on the L1 prediction direction. The derivation of the scaling parameters can be based on the following equations:

$$scale_{L0} = (defaultScale + deltaScale) \quad \text{(Eq. 6)}$$

$$scale_{L1} = \text{Floor}\left(\frac{defaultScale^2}{defaultScale + deltaScale}\right) \quad \text{(Eq. 7)}$$

In one embodiment, when the scaling parameter and the offset parameter for one prediction direction (e.g. L0 prediction direction) are signaled or derived to be $scale_{L0}$ and $offset_{L0}$ respectively, the offset parameter of the other prediction direction (e.g. L1 prediction direction) can be derived in the following equation:

$$offset_{L1} = -\text{Floor}\left(\frac{offset_{L0}}{scale_{L0}}\right) \quad \text{(Eq. 8)}$$

In one embodiment, one scaling parameter and one offset parameter can be signaled for the bidirectional block. The scaling parameter can be signaled to be the value of scaling factor one, e.g. 32 in case of the 5-bit precision. The signaled offset parameter and the scaling factor can be applied to one prediction direction, for example, on the L0 prediction direction. The signaled offset parameter with a reversed sign and the scaling factor can be applied to the L1 prediction direction.

In one embodiment, only one reference list can be allowed for the bidirectional block if the LWP is applied to the bidirectional block. In one example, if the bidirectional block is in a merge/skip mode, only the reference list L0 can be valid. That is, the scaling parameter and the offset parameter of the bidirectional block can only be applied to the reference list L0. Motion information of the reference list L1 may or may not be used as MV predictors for other blocks.

In one embodiment, if the bidirectional block is coded in a regular inter mode, the LWP cannot be applied to the bidirectional block.

In one embodiment, if the first flag such as the LWP flag is signaled before the inter prediction direction is indicated and the first flag is true, a uni-directional inter prediction can be inferred. Either the reference list L0 or list L1 can be used for the bidirectional block. The reference list used for the bidirectional block can be signaled.

In one embodiment, for the bidirectional block, the scaling factor and the offset value can be applied to the L0 prediction direction to derive an L0 prediction block. The final prediction block can be derived as an average of the L0 prediction block and a prediction block corresponding to the L1 prediction direction.

In one embodiment, for the bidirectional block, the scaling factor and the offset value can be applied to the L1 prediction direction to derive L1 prediction block. The final prediction block can be derived as an average of the L1 prediction block and a prediction block corresponding to the L0 prediction direction.

In one embodiment, for the bidirectional block, the two prediction blocks (L0 and L1 prediction blocks) can be obtained before applying the LWP, and then the scaling factor and the offset value can be applied to a prediction block obtained by averaging the two prediction blocks.

VII. Flowchart

Figure 19:
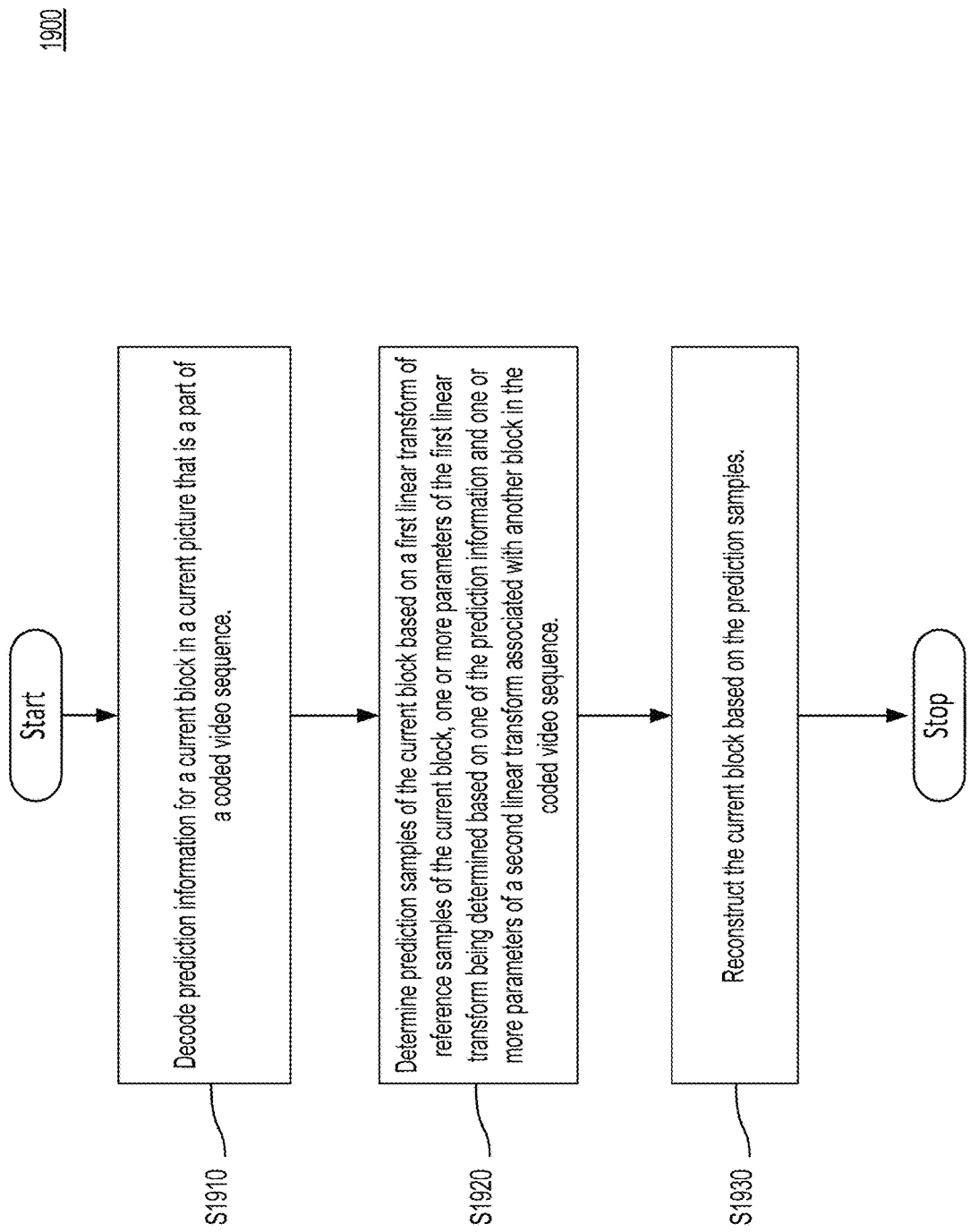
FIG. 19 shows an exemplary flowchart in accordance with an embodiment.

FIG. 19 shows a flow chart outlining an exemplary process (1100) according to an embodiment of the disclosure. In various embodiments, the process (1100) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1900) is implemented in software instructions, thus when the processing circuitry executes the software instructions, the processing circuitry performs the process (1900).

The process (1900) may generally start at step (S1910), where the process (1900) decodes prediction information for a current block in a current picture that is a part of a coded video sequence. Then, the process (1900) proceeds to step (S1920).

At step (S1920), the process (1900) determines prediction samples of the current block based on a first linear transform of reference samples of the current block. One or more parameters of the first linear transform are determined based on one of the prediction information and one or more parameters of a second linear transform associated with another block in the coded video sequence. Then, the process (1900) proceeds to step (S1930).

At step (S1930), the process (1900) reconstructs the current block based on the prediction samples.

In one embodiment, the prediction information indicates an inter prediction mode for the current block.

In one embodiment, the other block is one of a neighboring block and a merge candidate of the current block.

In one embodiment, the process (1900) determines whether the first linear transform is applied to the reference samples of the current block based on a first flag that is determined based on one of the prediction information and the merge candidate of the current block. The process (1900) determines the prediction samples of the current block in response to the first linear transform being determined to be applied to the reference samples of the current block.

In one embodiment, the one or more parameters of the first linear transform are determined based on the merge candidate of the current block and the prediction information indicating one of a merge mode and a skip mode for the current block.

In one embodiment, one of the one or more parameters of the first linear transform is determined as a default value based on a second flag that is determined based on one of the prediction information and the merge candidate of the current block.

In one embodiment, each of the one or more parameters of the first linear transform includes a sign value and a magnitude value.

In one embodiment, each of the one or more parameters of the first linear transform is determined based on a set of values corresponding to the respective parameter and an index indicating one of the set of values for the respective parameter.

In one embodiment, each of the one or more parameters of the first linear transform is determined based on a delta value of the respective parameter relative to one of a default value and one of the one or more parameters of the second transform associated with the other block in the coded video sequence.

In one embodiment, the prediction information indicates a bi-directional prediction mode for the current block, and the process (1900) determines the prediction samples of the current block based on the first linear transform of at least one reference block of the current block. Each of the at least one reference block corresponds to one prediction direction of the bi-directional prediction mode.

In one embodiment, the process (1900) determines, for each prediction direction of the bi-directional prediction mode, a prediction block of the current block based on the first linear transform of one of the at least one reference block of the current block corresponding to the respective prediction direction. The process (1900) determines the prediction samples of the current block based on an average of the prediction blocks.

In one embodiment, the prediction information indicates a bi-directional prediction mode for the current block, and the process (1900) determines, for each prediction direction of the bi-directional prediction mode, a prediction block of the current block based on a reference block of the current block corresponding to the respective prediction direction. The process (1900) determines the prediction samples of the current block based on the first linear transform of an average of the prediction blocks.

VIII. Computer System

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
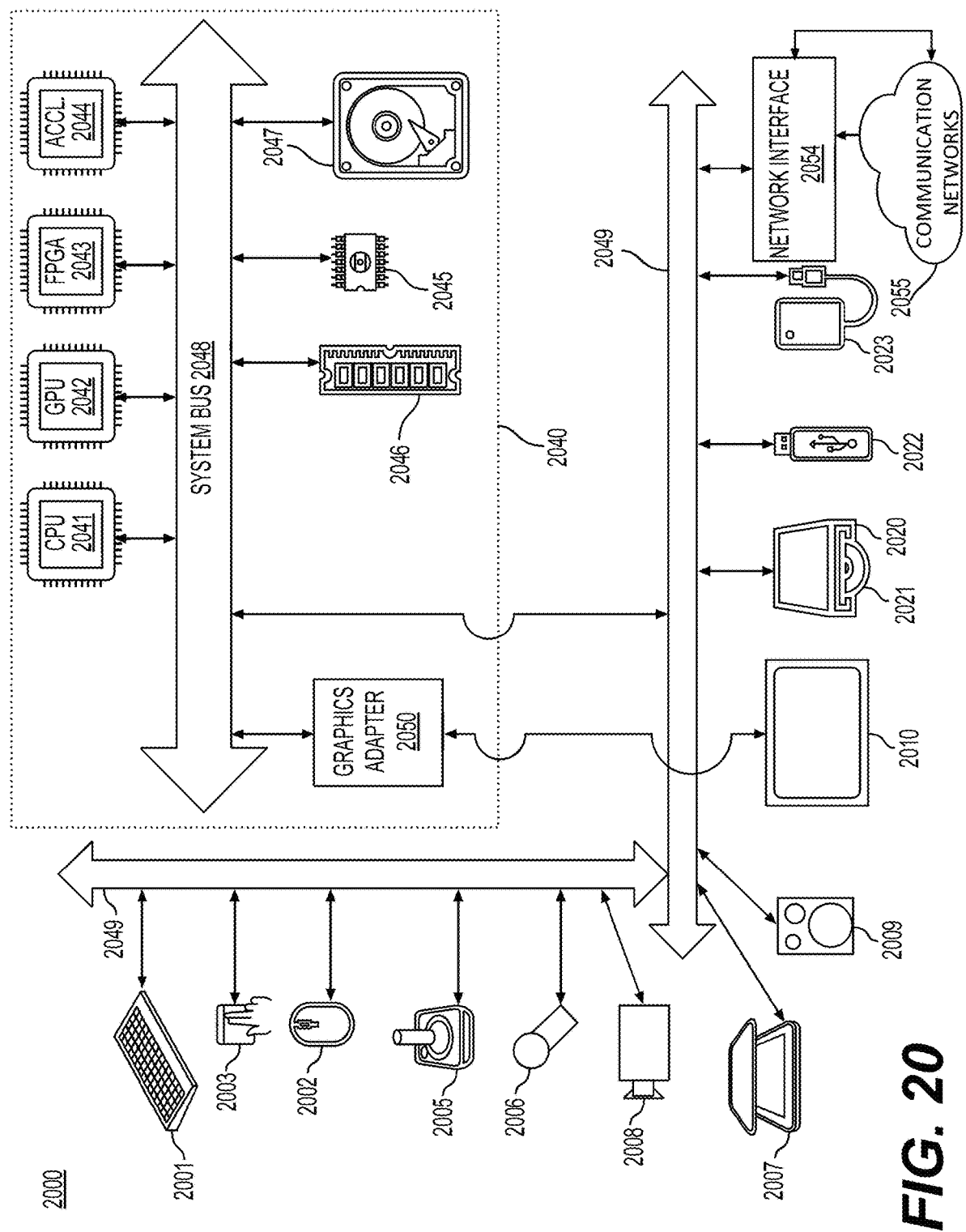
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (2010)) can be connected to a system bus (2048) through a graphics adapter (2050).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include a network interface (2054) to one or more communication networks (2055). The one or more communication networks (2055) can for example be wireless, wireline, optical. The one or more communication networks (2055) can further be local, wide-area, metropolitan, vehicular and industrial, real-time, delay-tolerant, and so on. Examples of the one or more communication networks (2055) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), and so forth. These devices, along with Read-only memory (ROM) (2045), Random-access memory (2046), internal mass storage such as internal non-user accessible hard drives, SSDs, and the like (2047), may be connected through the system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Appendix A: Acronyms

AMVP: Advanced Motion Vector Prediction
ASIC: Application-Specific Integrated Circuit
ATMVP: Alternative/Advanced Temporal Motion Vector Prediction
BMS: Benchmark Set
BV: Block Vector
CANBus: Controller Area Network Bus
CB: Coding Block
CD: Compact Disc
CPR: Current Picture Referencing CPUs: Central Processing Units
CRT: Cathode Ray Tube
CTBs: Coding Tree Blocks
CTUs: Coding Tree Units
CU: Coding Unit
DPB: Decoder Picture Buffer
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HRD: Hypothetical Reference Decoder
IBC: Intra Block Copy
IC: Integrated Circuit
JEM: Joint Exploration Model
LAN: Local Area Network
LCD: Liquid-Crystal Display
LTE: Long-Term Evolution
MV: Motion Vector
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SCC: Screen Content Coding
SEI: Supplementary Enhancement Information
SNR: Signal Noise Ratio
SSD: Solid-state Drive
TUs: Transform Units
USB: Universal Serial Bus
VUI: Video Usability Information
VVC: Versatile Video Coding

What is claimed is:

1. A method for video decoding in a decoder, the method comprising:
decoding prediction information for a current block in a current picture that is a part of a coded video sequence;
determining prediction samples of the current block based on a first linear transform of reference samples of the current block, at least one of a scaling parameter or an offset parameter of the first linear transform being (i) signaled in the prediction information or (ii) determined based on at least one of a scaling parameter or an offset parameter of a second linear transform associated with another block in the coded video sequence; and
reconstructing the current block based on the prediction samples, wherein
based on a determination that the prediction information indicates a bi-directional prediction mode for the current block and two reference pictures of the bi-directional prediction mode are on different sides of the current picture, the offset parameter of the first linear transform for a first prediction direction is determined based on the scaling parameter and the offset parameter of the first linear transform for a second prediction direction, the offset parameter of the first linear transform for the first prediction direction being different from the offset parameter of the first linear transform for the second prediction direction.

2. The method of claim 1, wherein the prediction information indicates an inter prediction mode for the current block.

3. The method of claim 1, wherein the other block is one of a neighboring block or a merge candidate of the current block.

4. The method of claim 3, wherein the determining further comprises:
determining whether the first linear transform is applied to the reference samples of the current block based on a first flag that is determined based on one of the prediction information or the merge candidate of the current block; and
determining the prediction samples of the current block in response to the first linear transform being determined to be applied to the reference samples of the current block.

5. The method of claim 3, wherein one of the scaling parameter or the offset parameter of the first linear transform is determined based on the merge candidate of the current block and the prediction information indicating one of a merge mode or a skip mode for the current block.

6. The method of claim 3, wherein one of the scaling parameter or the offset parameter of the first linear transform is determined as a default value based on a second flag that is determined based on one of the prediction information or the merge candidate of the current block.

7. The method of claim 1, wherein
each of the scaling parameter and the offset parameter of the first linear transform includes a sign value and a magnitude value, and
based on the determination that the prediction information indicates the bi-directional prediction mode for the current block and the two reference pictures of the bi-directional prediction mode are on different sides of the current picture, the offset parameter of the first linear transform for the first prediction direction is determined based on a largest integer that is less than or equal to a ratio of the scaling parameter and the offset parameter of the first linear transform for the second prediction direction.

8. The method of claim 1, wherein each of the scaling parameter and the offset parameter of the first linear transform is determined based on a set of values corresponding to the respective parameter and an index indicating one of the set of values for the respective parameter.

9. The method of claim 1, wherein each of the scaling parameter and the offset parameter of the first linear transform is determined based on a delta value of the respective parameter relative to one of a default value or one of the scaling parameter or the offset parameter of the second transform associated with the other block in the coded video sequence.

10. The method of claim 1, wherein the prediction information indicates the bi-directional prediction mode for the current block, and the determining further comprises:
determining the prediction samples of the current block based on the first linear transform of at least one reference block of the current block, each of the at least one reference block corresponding to one prediction direction of the bi-directional prediction mode.

11. The method of claim 10, wherein the determining further comprises:
determining, for each prediction direction of the bi-directional prediction mode, a prediction block of the current block based on the first linear transform of one of the at least one reference block of the current block corresponding to the respective prediction direction; and determining the prediction samples of the current block based on an average of the prediction blocks.

12. The method of claim 1, wherein the prediction information indicates a bi-directional prediction mode for the current block, and the determining the prediction samples comprises:
   determining, for each prediction direction of the bi-directional prediction mode, a prediction block of the current block based on a reference block of the current block corresponding to the respective prediction direction; and
   determining the prediction samples of the current block based on the first linear transform of an average of the prediction blocks.

13. An apparatus, comprising processing circuitry configured to:
   decode prediction information for a current block in a current picture that is a part of a coded video sequence;
   determine prediction samples of the current block based on a first linear transform of reference samples of the current block, at least one of a scaling parameter or an offset parameter of the first linear transform being (i) signaled in the prediction information or (ii) determined based on at least one of a scaling parameter or an offset parameter of a second linear transform associated with another block in the coded video sequence; and
   reconstruct the current block based on the prediction samples, wherein
   based on a determination that the prediction information indicates a bi-directional prediction mode for the current block and two reference pictures of the bi-directional prediction mode are on different sides of the current picture, the offset parameter of the first linear transform for a first prediction direction is determined based on the scaling parameter and the offset parameter of the first linear transform for a second prediction direction, the offset parameter of the first linear transform for the first prediction direction being different from the offset parameter of the first linear transform for the second prediction direction.

14. The apparatus of claim 13, wherein the prediction information indicates an inter prediction mode for the current block.

15. The apparatus of claim 13, wherein the other block is one of a neighboring block or a merge candidate of the current block.

16. The apparatus of claim 15, wherein the processing circuitry is further configured to:
   determine whether the first linear transform is applied to the reference samples of the current block based on a first flag that is determined based on one of the prediction information or the merge candidate of the current block; and
   determine the prediction samples of the current block in response to the first linear transform being determined to be applied to the reference samples of the current block.

17. The apparatus of claim 15, wherein one of the scaling parameter or the offset parameter of the first linear transform is determined based on the merge candidate of the current block and the prediction information indicating one of a merge mode or a skip mode for the current block.

18. The apparatus of claim 15, wherein one of the scaling parameter or the offset parameter of the first linear transform is determined as a default value based on a second flag that is determined based on one of the prediction information or the merge candidate of the current block.

19. The apparatus of claim 13, wherein each of the scaling parameter and the offset parameter of the first linear transform includes a sign value and a magnitude value.

20. A non-transitory computer-readable storage medium storing instructions executable by at least one processor to perform:
   decoding prediction information for a current block in a current picture that is a part of a coded video sequence;
   determining prediction samples of the current block based on a first linear transform of reference samples of the current block, at least one of a scaling parameter or an offset parameter of the first linear transform being (i) signaled in the prediction information or (ii) determined based on at least one of a scaling parameter or an offset parameter of a second linear transform associated with another block in the coded video sequence; and
   reconstructing the current block based on the prediction samples, wherein
   based on a determination that the prediction information indicates a bi-directional prediction mode for the current block and two reference pictures of the bi-directional prediction mode are on different sides of the current picture, the offset parameter of the first linear transform for a first prediction direction is determined based on the scaling parameter and the offset parameter of the first linear transform for a second prediction direction, the offset parameter of the first linear transform for the first prediction direction being different from the offset parameter of the first linear transform for the second prediction direction.

* * * * *